United States Patent [19]

Sandner et al.

[11] 4,033,911
[45] July 5, 1977

[54] PROCESS FOR CATALYZING POLYURETHANE FOAM FORMATION USING N,N-DIMETHYL-AMINOALKOXY-PROPIONITRILES

[75] Inventors: Michael Ray Sandner, Chappaqua; Bela Prokai, Mahopac, both of N.Y.

[73] Assignee: Union Carbide Corporation, New York, N.Y.

[22] Filed: June 24, 1976

[21] Appl. No.: 699,459

[52] U.S. Cl. .................... 260/2.5 AC; 260/2.5 AB; 260/75 NB; 260/75 NC; 260/77.5 AB; 260/77.5 AC
[51] Int. Cl.² ........................................ C08G 18/14
[58] Field of Search ............... 260/2.5 AB, 2.5 AC, 260/75 NB, 75 NC, 77.5 AB, 77.5 AC

[56] References Cited

UNITED STATES PATENTS

| 2,941,967 | 6/1960 | Moller et al. | 260/2.5 AC |
|---|---|---|---|
| 3,330,782 | 7/1967 | Poppelsdorf | 260/2.5 AC |
| 3,478,096 | 11/1969 | Ayba | 260/2.5 AC |
| 3,660,319 | 5/1972 | Yeakey | 260/2.5 AC |
| 3,925,268 | 12/1975 | Rosemund et al. | 260/2.5 AC |

FOREIGN PATENTS OR APPLICATIONS

| 676,183 | 12/1963 | Canada |
|---|---|---|
| 879,167 | 10/1961 | United Kingdom |
| 893,240 | 4/1962 | United Kingdom |

*Primary Examiner*—Eugene C. Rzucidlo
*Attorney, Agent, or Firm*—Marylin Klosty

[57] ABSTRACT

Cellular urethane polymers are provided by effecting the reaction of an organic polyol reactant comprising a polyether polyol and an organic polyisocyanate reactant in the presence of a blowing agent and a catalyst system comprising an N,N-dimethylaminoalkoxypropionitrile. The said N,N-dimethylaminoalkoxypropionitriles are versatile, low odor catalysts and are useful in forming cellular urethane polymers ranging from all water-blown flexible polyether foam to all fluorocarbon-blown rigid foam products. Especially preferred for use in the practice of the invention are 3-(2-dimethylaminoethoxy)propionitrile and 3-[2-(2-dimethylaminoethoxy)ethoxy]propionitrile either as such or in combination with other catalysts including other tertiary-amine components and/or organic compounds of tin. Also provided are blended catalyst systems comprising said dimethylaminoalkoxypropionitriles.

37 Claims, No Drawings

PROCESS FOR CATALYZING POLYURETHANE FOAM FORMATION USING N,N-DIMETHYL-AMINOALKOXY-PROPIONITRILES

BACKGROUND OF THE INVENTION

This invention pertains to the use of N,N-dimethylaminoalkoxypropionitriles as catalysts in the formation of cellular urethane polymers by the reaction of organic polyisocyanates and active hydrogen-containing compounds in the presence of a blowing agent. The invention also relates to particular blended catalysts comprising the said N,N-dimethylaminoalkoxypropionitriles including the use thereof for polyurethane foam formation.

It is well known to the art that cellular urethane polymers are provided by the reaction of organic polyisocyanates and active hydrogen-containing organic compounds such as in particular organic polyols, in the presence of a source of blowing action and one or more activators. It is also known that a number of different chemical reactions occur during polymer formation and expansion. For example, in addition to the chain-extending, urethane-forming reaction between free isocyanate groups and active hydrogen, initially formed urethane linkages bearing secondary hydrogen may also function as a source of active hydrogen and react with additional isocyanate to form cross-links between polymer chains. Further, in systems wherein the blowing agent comprises water such as, for example, flexible, semi-flexible and many rigid foam formulations, isocyanate is also consumed by reaction with water, thereby generating carbon dioxide blowing agent in situ, and introducing further cross-links comprising urea groups. The nature of the cellular structure and the physical and mechanical properties of the foam are influenced by the extent of such reactions, and the relative rates and point in time at which they occur. Although balancing these variables so as to achieve a particular type or grade of foam can be controlled to some extent by the functionality, molecular weight and other structural features of the polyisocyanate and active hydrogen-containing reactants, the catalyst system also plays a significant role in this respect.

Among the types of compounds that have achieved long-standing widespread commercial application as catalysts in polyurethane foam manufacture are: tertiary-amines consisting of carbon, hydrogen and amino nitrogen, as typically illustrated by 1,4-diazabicyclo-[2.2.2]octane ("triethylenediamine"), N,N,N',N'-tetramethyl-1,3-butanediamine and N,N-dimethylcyclohexlamine; tertiary-amines consisting of carbon, hydrogen, amino nitrogen and oxygen wherein oxygen is present as ether oxygen, as typically illustrated by bis[2-(N,N-dimethylamino)ethyl]ether and N-ethylmorpholine; and tertiary-amines consisting of carbon, hydrogen and oxygen wherein oxygen is present as hydroxyl as typically illustrated by N,N-dimethylethanolamine.

More recent advances in cellular urethane manufacture include the utilization of low odor tertiary-amines consisting of carbon, hydrogen, amino nitrogen and oxygen where oxygen is present as carbonyl or either a carboxylate or dimethylamido group, as described and claimed in U.S. Pat. No. 3,821,131, granted June 28, 1974. An especially effective catalyst of this latter type is 3-dimethylamino-N,N-dimethylpropionamide. Another relatively recent advance in the catalysis of cellular urethane manufacture is the use of amine catalyst systems comprising 3-dimethylaminopropionitrile which is also a low odor catalyst. This particular advance is described in U.S. Pat. No. 3,925,268, granted Dec. 9, 1975.

From the standpoint of catalytic activity for the $H_2O$-/—NCO reaction, the more potent of the aforementioned specific amines are triethylenediamine and bis[2-(N,N-dimethylamino)ethyl]ether. Such catalysts, which are also relatively expensive, are usually supplied and utilized in dilute form as solutions in catalytically inactive diluents such as glycols. Illustrative of such diluents are diethylene glycol and dipropylene glycol.

Of the aforementioned amines, one of the least expensive to manufacture is N,N-dimethylethanolamine ("DMEA") which is readily prepared as the 1:1 molar adduct of dimethylamine and ethylene oxide. Another attractive feature of DMEA is that it is less odorous than many other conventional amines such as N-ethylmorpholine, and those consisting of carbon, hydrogen and amino nitrogen such as, in particular, triethylenediamine and N,N,N',N'-tetramethyl-1,3-butanediamine. Relative to triethylenediamine and bis[2-(N,N-dimethylamino)ethyl]ether, DMEA exhibits moderate activity as a catalyst for water-blown, flexible stabstock. It is often necessary, therefore, in its use in the manufacture of conventional flexible slabstock, to employ DMEA at enhanced concentrations relative to more potent catalysts, in order to meet particular activity and foam property specifications of the foam manufacturer. The use of higher concentrations in turn may enhance any potential deleterious effects of residual amino nitrogen on foam properties. In view of its low cost and low odor, DMEA is typically used in combination with other amines either as a catalytically active diluent for more potent and expensive amines or to "spike" the activity of less potent but more expensive catalysts.

Further in regard to DMEA as well as certain amines of the catalytically potent variety such as triethylenediamine and N,N-dimethylcyclohexylamine, it is found that, whereas they may be suitable for forming conventional flexible and rigid foam, they are unsatisfactory catalysts over a broad range of concentration for the manufacture of void-free, semi-flexible molded foam.

It is also found that certain amines which have widespread application in the manufacture of flexible polyether slabstock such as bis[2-(N,N-dimethylamino)ethyl]ether, have limited application as catalysts in the manufacture of rigid foam blown with fluorocarbon or a combination of fluorocarbon and water.

It is desirable, therefore, and is a primary object of this invention to advance the art to polyurethane foam manufacture by the employment of relatively low cost, low odor N,N-dimethylaminoalkoxypropionitriles which can be used with advantage from the standpoint of: (1) enhanced catalytic activity relative, in particular, to 3-dimethylaminopropionitrile and N,N-dimethylethanolamine; and/or (2) greater versatility in a wide variety of foam formulations including semi-flexible systems, rigid systems blown with fluorocarbon or a combination of florocarbon and water, as well as water-blown flexible polyether foam. Various other objects and advantages of this invention will become apparent to those skilled in the art from the accompanying description and disclosure.

SUMMARY OF THE INVENTION

In accordance with one aspect of the teachings of the present invention, cellular polyurethanes are provided by the method which comprises simultaneously reacting and foaming a reaction mixture containing: (1) an organic polyol reactant comprising a polyether polyol having an average hydroxyl functionality of at least two; (2) an organic polyisocyanate reactant having an average isocyanate functionality of at least two; (3) a blowing agent; and (4) a catalytic system comprising an N,N-dimethylaminoalkoxypropionitrile as more particularly described hereinafter.

The particular N,N-dimethylaminoalkoxypropionitriles employed in the practice of the present invention are characterized by the presence of a tertiary-dimethylamino group, one or more ether oxygen atoms and one cyano group, the said amino and cyano groups being positioned beta to either a common or different acyclic ether oxygen atom. In those compounds having a plurality of ether linkages, the ether oxygen atoms are also positioned beta to one another. Overall, the N,N-dimethylaminoalkoxypropionitriles as described herein have from one to five acyclic ether oxygen atoms and at least seven and no more than 27 carbon atoms, no individual continuous carbon chain bonded to ether oxygen having more than four carbon atoms.

The aforesaid essential structural characteristics of the N,N-dimethylaminoalkoxypropionitriles employed in the practice of this invention are conveniently expressed by the following general Formula I:

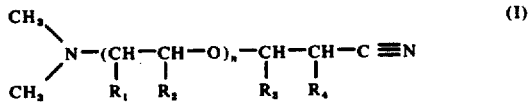

wherein and as defined for the purpose of the entire specification:
- $R_1$ and $R_2$ each represents hydrogen, methyl or ethyl provided that, cumulatively, $R_1$ and $R_2$ have no more than 2 carbon atoms;
- $R_3$ and $R_4$ each represents hydrogen, methyl or ethyl provided that, cumulatively, $R_3$ and $R_4$ have no more than 2 carbon atoms; and
- $n$ has an average value from 1 to about 5.

In the compounds encompassed by Formula I, the $R_1$, $R_2$, $R_3$ and $R_4$ groups may be the same as or different from one another.

The above-described N,N-dimethylaminoalkoxypropionitriles are useful as catalysts in the manufacture of a wide variety of cellular urethanes ranging from water-blown flexible polyether foam to fluorocarbon-blown rigid foam including semi-flexible and high-resilience foam. Accordingly, in the method of this invention the blowing agent can be water, a fluorocarbon or a combination of water and fluorocarbon. Suitable organic polyol reactants for use in the practice of this invention are polyether polyols having an average hydroxyl functionality of from two to about 8 including polymer/polyether polyols produced by the in situ polymerization of an ethylenically unsaturated monomer in a polyether polyol. Illustrative of the polyisocyanates that can be employed are aromatic diisocyanates, polymeric aryl isocyanates, and polyfunctional isocyanates produced as residue products in the manufacture of aromatic diisocyanates. In addition to their catalytic versatility, the said N,N-dimethylaminoalkoxypropionitriles have the further highly desirable characteristic of low residual odor and thus allow for the formation of foam products essentially free of the post-cure odor associated with many other tertiary amines.

Particularly versatile catalyst systems for use in the practice of the present invention are those comprising at least one of the following compounds within the scope of Formula I which compounds, for the sake of brevity, are also referred to herein by the abbreviations, DMAEPN and DMAEEPN, as indicated:

DMAEPN = 3-(2-dimethylaminoethoxy)propionitrile which has the formula,

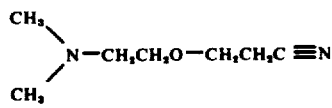

DMAEEPN = 3-[2-(2-dimethylaminoethoxy)ethoxy]-propionitrile which has the formula,

In addition to their versatility and, as discussed and demonstrated with specific reference to foam data presented herein, DMAEPN and DMAEEPN are used with particular advantage and exhibit unexpected catalytic activity in the formation of one-shot, water-blown, flexible polyurethane foam derived from a polyether polyol and in the formation of rigid foam blown with a blowing agent comprising water. Other beneficial and unexpected properties include ability to provide water-blown flexible foam of enhanced porosity and void-free semi-flexible foam.

The N,N-dimethylaminoalkoxypropionitriles may be employed in substantially pure form or in combination with distillable residual by-products produced in their manufacture. They are effective activators when used as the sole type of nitrogen-bearing catalytic component of polyurethane foam-producing reaction mixtures, although their employment in combination with certain tertiary amines and/or organic compounds of tin is found to be beneficial in a number of foam-producing reaction mixtures.

The present invention also provides for the formation of cellular urethane polymers in the presence of amine catalyst systems comprising the compounds encompassed by Formula I in combination with one or more types of tertiary amines. Such additional amines include: bis[2-(N,N-dimethylamino)alkyl]ethers such as in particular bis[2-(N,N-dimethylamino)ethyl]ether; residue product formed in the manufacture of the latter bis-ether by the method described and claimed in U.S. Pat. No. 3,957,875, patented 5/18/76 and incorporated herein by reference; 3-dialkylamino-N,N-dimethylpropionamides such as in particular 3-dimethylamino-N,N-dimethylpropionamide; N,N-dimethylcyclohexylamine; 3-dialkylaminopropionitriles; and hydrocarbyl polyamines including triethylenediamine, and N,N,N',N'-tertraalkyl-1,3-butanediamines.

Also contemplated is the formation of polyether polyol derived urethane foam in the presence of the N,N-dimethylaminoalkoxypropionitriles encompassed by Formula I in combination with organic compounds of tin such as, in particular, tin carboxylates and dialkyl tin dicarboxylates either as the sole type of co-catalyst or in further combination with an additional tertiary amine such as the afore-mentioned mono and polyamines.

Also included within the scope of the present invention are catalyst blends comprising at least one N,N-dimethylaminoalkoxypropionitrile encompassed by Formula I such as in particular the aforementioned DMAEPN and DMAEEPN, a second amine component and/or an organic compound of tin such as in particular dibutyltin dilaurate.

DETAILED DESCRIPTION OF THE INVENTION AND PREFERRED EMBODIMENTS

A. The N,N-dimethylaminoalkoxypropionitriles

Typical examples of suitable aminoalkoxypropionitriles for use in the formation of cellular urethane polymers in accordance with the teachings of this invention are the following compounds.

3-(2-dimethylaminoethoxy)propionitrile (DMAEPN)

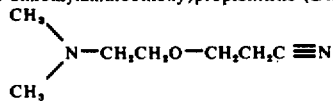

3-[2-(2-dimethylaminoethoxy)ethoxy]propionitrile (DMAEEPN)

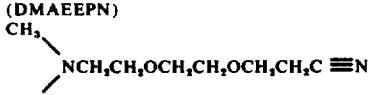

3-(2-dimethylaminoethoxy)-2-methylpropionitrile

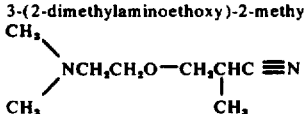

3-(2-dimethylamino-2-propoxy)propionitrile

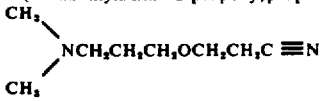

3-(2-dimethylaminoethoxy)butyronitrile

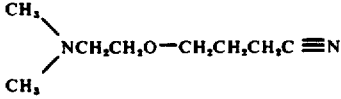

Of the compounds encompassed by Formula I, the preferred catalysts for use in forming polyurethane foam as described herein are those in which $R_1$ through $R_4$ are hydrogen or methyl. Most preferably, $R_1$ through $R_4$ are hydrogen. From the standpoint of the number of ether linkages, $n$ preferably has an average value of no more than about three and is most preferably from one to about two. Accordingly, the particularly outstanding dimethylaminoalkoxypropionitriles are 3-(2-dimethylaminoethoxy)propionitrile (DMAEPN), which is a known compound and 3-[2-(2-dimethylaminoethoxy)ethoxy]propionitrile (DMAEEPN), which is a novel compound.

The dimethylaminoalkoxypropionitriles employed in the practice of the invention may be prepared by known reactions. One such reaction comprises reacting a dimethylalkanolamine with acrylonitrile as illustrated by the following Equation 1.

Equation 1

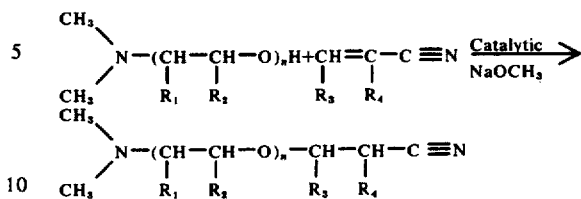

wherein $R_3$ and $R_4$ may be the same as or different from $R_1$ and $R_2$.

The dimethylalkanolamine starting material may be conveniently prepared in accordance with the procedure given in copending application Ser. No. 581,745 filed on May 29, 1975. Addition of acrylonitrile to such starting material in the presence of sodium methylate is effected at temperatures usually less than about 50° C.

Another method for preparing the N,N-dimethylaminoalkoxypropionitriles encompassed by Formula I comprises the reaction of a β-halo nitrile with an alkanolaminealkoxide. This method is illustrated by the following Equation 2.

Equation 2

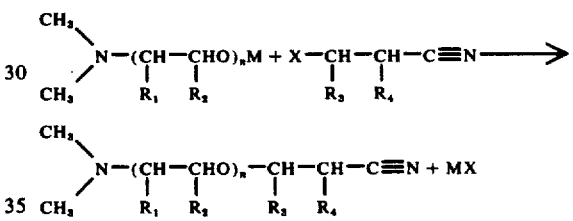

wherein M is alkali metal such as sodium and potassium, X is halogen such as chlorine or bromine, and $R_3$ and $R_4$ may be the same as or different from $R_1$ and $R_2$. The reactions encompassed by Equation 2 are suitably effected at temperatures from about 20° C. to about 150° C.

B. THE FOAM FORMULATIONS

In producing cellular urethane polymers in accordance with the teachings of this invention, in addition to the catalyst systems comprising the N,N-dimethylaminoalkoxypropionitriles described herein, the reaction mixture of foam formulation contains an organic polyisocyanate and an organic polyol containing a polyether polyol having an average of at least two and usually not more than eight hydroxyl groups. Such organic polyol reactants include compounds consisting of carbon, hydrogen and oxygen as well as compounds which contain these elements in combination with phosphorus, halogen and/or nitrogen. nitrogen. classes of organic polyol reactants for use in the method of this invention are polyether polyols including nitrogen-containing polyether polyols and polymer/polyether polyols produced by polymerizing an ethylenically unsaturated monomer in a polyether polyol in the presence of a free radical initiator.

It is well known to the cellular polyurethane art that the particular polyol reactant or combination of polyols employed in any given formulation depends in large measure upon the end-use application of the cellular product, and that the end-use in turn determines whether the product is to be provided as a flexible, semi-flexible, high-resilience or rigid foam. A characteristic of the polyol reactant is its hydroxyl number which is determined by and defined as the number of milligrams of potassium hydroxide required for the complete neutralization of the hydrolysis product of the fully acetylated derivative prepared from 1 gram of polyol or mixture of polyols. The hydroxyl number is also defined by the following equation which reflects its relationship with the functionality and molecular weight of the polyol reactant:

$$OH\ No. = \frac{56.1 \times 1000 \times f}{M.W.}$$

where
  OH = hydroxyl number of the polyol;
  $f$ = average functionality, that is, average number of hydroxyl groups per molecule of polyol; and
  M. W. = average molecular weight of the polyol.

The catalyst systems of the present invention are suitably employed as catalytic components of formulations containing polyether polyols having an average hydroxyl number from about 18 to about 1000. In producing flexible polyether urethane foam, the polyether polyol reactant has a relatively low hydroxyl number such as from about 20 to about 125. For flexible foam the hydroxyl number is usually no more than 75. Generally employed for rigid foam formulations are organic polyol reactants comprising polyether polyols having a relatively high hydroxyl number from about 200 up to about 1000 such as, in particular, a hydroxyl number within the range from about 300 to about 800. In providing semi-flexible foam, the organic polyol reactant may be a polyether polyol having a hydroxyl number within the range from about 100 to about 200. For the manufacture of semi-flexible foam of enhanced load-bearing properties, however, the polyol reactant preferably comprises a polymer/polyol having a hydroxyl number from about 20 to about 65. For high-resilience urethane foam, the organic polyol reactant also preferably comprises a polymer/polyol the hydroxyl number of which may be from about 18 to about 65.

The class of suitable polyether polyols of which the polyol reactant may be comprised includes linear and branched polyethers having an average functionality from two to eight. For convenience, this class of polyether polyols are referred to herein as Polyol I. These polyols include alkylene oxide adducts of water such as polyethylene glycols having average molecular weights from about 200 to about 600, polypropylene glycols having average molecular weights from about 400 to about 2,000, and polyoxyalkylene polyols having a combination of different alkylene oxide units. Other suitable polyols encompassed within the definition of Polyol I are the alkylene oxide adducts of polyhydric organic initiators, the nature of which determines the average hydroxyl functionality of the polyoxyalkylated product. Illustrative of suitable polyhydric organic initiators are the following which can be employed individually or in combination with one another: (1) diols such as ethylene glycol, diethylene glycol, propylene glycol, 1,5-pentanediol, hexylene glycol, dipropylene glycol, trimethylene glycol, 1,2-cyclohexanediol, 3-cyclohexene-1,1-dimethanol and 3,4-dibromocyclohexane-1,1-dimethanol; (2) triols such as glycerol, 1,2,6-hexanetriol, 1,1,1-trimethylolethane, 1,1,1-trimethylolpropane, 3-(2-hydroxyethoxy)- and 3-(2-hydroxypropoxy)-1,2-propanediols, 2,4-dimethyl-2-(2-hydroxyethoxy)methylpentanediol-1,5,1,1,1-tris[(2-hydroxyethoxy)-methyl ethane and 1,1,1-tris[(2-hydroxypropoxy)methyl]propane; (3) tetrols such as pentaerythritol; (4) pentols, hexols, heptanols and octanols such as glucose, sorbitol, bis(2,2,2-trimethylol)ethyl ether, alpha-methyl glucoside, sucrose, mannose and galactose; (5) compounds in which hydroxyl groups are bonded to an aromatic nucleus such as resorcinol, pyrogallol, phloroglucinol, di-, tri- and tetraphenylol compounds such as bis(p-hydroxyphenyl)methane and 2,2-bis(p-hydroxyphenyl)propane; and (6) alkylene oxide adducts of the aforesaid initiators such as propylene or ethylene oxide adducts of glycerol having a relatively low average molecular weight up to about 650.

The polyether polyols useful in the preparation of flexible polyether foam are those having a hydroxyl functionality from about 2 to about 4 and, as aforementioned, a hydroxyl number from about 20 to about 125. For rigid foam formulations, the polyol reactant comprises a polyether polyol (including nitrogen-containing polyether polyols discussed hereinbelow) having an average hydroxyl functionality from about 3 to about 8, and a hydroxyl number from about 200 up to about 1000. It is to be understood that the organic polyol component of rigid foam formulations may additionally contain, as a second type of polyol reactant, a diol having a hydroxyl number from about 200 to about 800.

The above-described polyether polyols are normally liquid materials and, in general, are prepared in accordance with well known techniques comprising the reaction of one or more polyhydric starters and an alkylene oxide in the presence of an oxyalkylation catalyst. Usually, the catalyst is an alkali metal hydroxide such as, in particular, potassium hydroxide. The oxyalkylation of the polyhydric initiator is carried out at temperatures ranging from about 90° C. to about 150° C. and usually at an elevated pressure up to about 200 p.s.i.g., employing a sufficient amount of alkylene oxide and adequate reaction time to obtain a polyol of desired molecular weight which is conveniently followed during the course of the reaction by standard hydroxyl number determinations, as defined above. The alkylene oxides most commonly employed in providing the reactants encompassed by Polyol I, are the lower alkylene oxides, that is, compounds having from 2 to 4 carbon atoms including ethylene oxide, propylene oxide, butylene oxides (1,2- or 2,3-) and combinations thereof. When more than one type of oxyalkylene unit is desired in the polyol product, the alkylene oxide reactants may be fed to the reaction system sequentially to provide polyoxyalkylene chains containing respective blocks of different oxyalkylene units or they may be fed simultaneously to provide substantially random distribution of units. Alternatively, the polyoxyalkylene chains may consist essentially of one type of oxyalkylene unit such as oxypropylene capped with oxyethylene units.

A second class of organic polyol reactants that are suitable for use in preparing polyurethane foams in accordance with the present invention are polymer/polyols which, for convenience, are referred to herein as Polyol II. Such polyols have hydroxyl numbers from about 18 to about 65. They are produced by polymerizing one or more ethylenically unsaturated monomers dissolved or dispersed in any of the other types of organic polyol reactants described herein, in the presence of a free radical catalyst. Illustrative of suitable substrate polyols for producing such compositions are those polyether polyols encompassed by the definition of Polyol I which have an average hydroxyl functionality from 2 to about 5. Also effective as the substrate polyol are the polyether polyols defined hereinbelow as Polyol III. Illustrative of the ethylenically unsaturated monomers are vinyl compounds having the general formula,

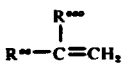

wherein: R" is hydrogen, methyl or any of the halogens (i.e., fluorine, chlorine, bromine or iodine); and R'" is R", cyano, phenyl, methyl-substituted phenyl, carboalkoxy, or alkenyl radicals having from 2 to 6 carbon atoms such as vinyl, allyl and isopropenyl groups. Typical examples of such polymerizable monomers are the following which may be employed individually or in combination: ethylene, propylene, acrylonitrile, methacrylonitrile, vinyl chloride, vinylidene chloride, styrene, alpha-methylstyrene, methyl methacrylate, and butadiene. In general, such compositions are prepared by polymerizing the monomers in the substrate polyol at a temperature between about 40° C. and about 150° C. employing any free radical-generating initiator including peroxides, persulfates, percarbonates, perborates and azo compounds. Illustrative of suitable initiators are: hydrogen peroxide, dibenzoyl peroxide, benzoyl hydroperoxide, lauroyl peroxide and azobis-(isobutyronitrile).

The polymer/polyol compositions usually contain from about 5 to about 50, and more usually from about 10 to about 40, weight percent of the vinyl monomer or monomers polymerized in the substrate polyether polyol. Especially effective polymer/polyols are those having the following composition:

A. from about 10 to about 30 weight percent of a copolymer of (1) acrylonitrile or methacrylonitrile, and (2) styrene or alpha-methylstyrene, the said copolymer containing from about 50 to 75 and from about 50 to 25 weight percent of monomeric units of (1) and (2), respectively; and B. from about 90 to about 70 weight percent of one or more of the aforementioned types of substrate polyether polyols.

A third class of polyether polyols of which the organic polyol reactant may be comprised are polyether polyols having the following combination of characteristics: (1) an average hydroxyl functionality from 2.1 to about 5; (2) a hydroxyl number from about 40 to 18; and (3) an average primary hydroxyl content between about 35 and 85 mole percent, based on the total number of hydroxyl groups contained in the polyol. For convenience, this particular class of polyols are referred to herein as Polyol III. This class of polyols are derived from ethylene oxide and propylene oxide and one of the aforesaid organic initiators having a hydroxyl functionality from about 3 to about 5 (such as, for example, glycerol) including appropriate mixtures of such initiators with one another and/or in combination with dihydric starters. The high primary hydroxyl content is introduced by capping of the polyoxyalkylene chains with at least a portion of the total ethylene oxide feed. Such highly reactive polyethers (i.e., Polyol III) are also especially useful as the substrate polyol in which the above-described polymer/polyols are formed.

As previously noted, for semi-flexible foam of enhanced load-bearing properties, polymer-polyols (Polyol II) are preferably employed. In general, the organic polyol reactant of such semi-flexible foam formulations is constituted of from about 50 up to 100 percent by weight of such polymer/polyols and correspondingly from about 50 to 0 weight percent of another polyether polyol which may be one or more of the polyether polyols encompassed by the above-described respective classes designated Polyol I and Polyol III. Usually, at least about 80 weight percent of the total polyol contained in such semi-flexible formulations is constituted of the polymer/polyols. When used, the second polyether polyol component is preferably of the type within the scope of Polyol III.

For formation of high-resilience foam, the organic polyol reactant comprises a polyether polyol within the class defined above as Polyol III. They may be used as essentially the sole type of polyether polyol in the formulation or they may be employed in combination with other polyols to control the degree of softness or firmness of the foam and to vary the load-bearing properties. For example, when softer grade high-resilience foams are desired, Polyol III may be used in combination with polyether diols such as the above-described lower alkylene oxide adducts of a dihydric initiator such as dipropylene glycol. However, when firm grades of high-resilience foams having enhanced load-bearing properties are desired, the organic polyol reactant of the foam formulation preferably comprises a polymer/polyol. In such high-resilience formulations, the organic polyol reactant is constituted of from about 20 up to about 60 weight percent of polymer/polyol and correspondingly from about 80 to about 40 weight percent of those polyether polyols encompassed by the definition of Polyol III. Usually, the high-resilience formulation contains no more than about 50 weight percent of polymer/polyol based on the weight of total polyol reactant contained in the formulation.

Another class of suitable polyether polyols for use in the practice of this invention are nitrogen-containing polyols. Illustrative of this class are lower alkylene oxide adducts of the following poly-functional amines which may be employed individually or in combination: primary and secondary polyamines such as ethylenediamine, diethylenetriamine and toluenediamine; and aminoalkanols such as ethanolamine, diethanolamine, triethanolumaine triethanolamine triisopropanolamine. Also suitable are mixed starters containing one or more of the aforesaid polyfunctional amines, aniline, and/or one or more of the polyhydric initiators employed to produce Polyol I such as dipropylene glycol, glycerol, sucrose and sorbitol. Preferably, the alkylene oxide is ethylene oxide, propylene oxide or a combination thereof. Such nitrogen-containing polyether polyols are usually employed in rigid foam formulations either as the sole type of organic polyol reactant or in combination with one or more polyether polyols encompassed by Polyol I. For application in forming rigid foam, such nitrogen-containing polyols, that is, polyols derived at least in part from a polyfunctional amine starter, also have hydroxyl numbers which are within the range from about 200 to about 1,000, and are more usually from about 300 to about 800. Other types of nitrogen-containing polyols are aniline-formaldehyde and aniline/phenol/formaldehyde condensation products which are also useful in rigid foam formulations.

The polyisocyanates used in the manufacture of cellular polyurethanes are known to the art and any such reactants are suitably employed in the practice of the present invention. Among such suitable polyisocyanates are those represented by the general formula:

$$Q(NCO)_i$$

wherein: $i$ has an average value of at least 2 and is usually no more than 6, and Q represents an aliphatic, cycloaliphatic or aromatic radical which can be an unsubstituted hydrocarbyl group or a hydrocarbyl group substituted, for example, with halogen or alkoxy. For example, Q can be an alkylene, cycloalkylene, arylene, alkyl-substituted cycloalkylene, alkarylene or aralkylene radical including corresponding halogen- and alkoxy-substituted radicals. Typical examples of such polyisocyanates for use in preparing the polyurethanes of this invention are any of the following including mixtures thereof: 1,6-hexamethylenediisocyanate; 1,4-tetramethylenediisocyane; bis(2-isocyanatoethyl)-fumarate; 1-methyl-2,4-diisocyanatocyclohexane; methylene-4,4''-diphenyldiisocyanate, commonly referred to as "MDI"; phenylene diisocyanates such as 4-methoxy-1,4-phenylenediisocyanate, 4-chloro-1,3-phenylenediisocyanate, 4-bromo-1,3-phenylenediisocyanate, 5,6-dimethyl-1,3-phenylenediisocyanate and 6-isopropyl-1,3-phenylenediisocyanate; 2,4-tolylene diisocyanate and 2,6-tolylene diisocyanate including mixtures of these two isomers as well as crude tolylene diisocyanate; isophoronediisocyanate; methylene-4,4'-dicyclohexyl-diisocyanate; durylene diisocyanate; triphenylmethane-4,4',4''-triisocyanate; and other organic polyisocyanates known to the polyurethane art. Of the aforesaid types of polyisocyanates, those containing aromatic nuclei are generally preferred.

Also useful as polyisocyanate reactants are polymeric isocyanates having units of the formula:

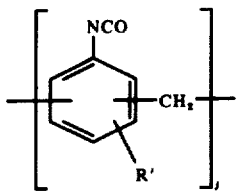

wherein R' is hydrogen and/or lower alkyl and $j$ has an average value of at least 2.1. Usually, the lower alkyl radical is methyl and $j$ has an average value no higher than about 4. Particularly useful polymeric aryl isocyanates of this type are the polyphenylmethylene polyisocyanates produced by phosgenation of the polyamine obtained by acid-catalyzed condensation of aniline with formaldehyde. They are low viscosity (50–500 centipoisies at 25° C.) liquids having average isocyanato functionalities in the range of about 2.25 to about 3.2 or higher, and free —NCO contents of from about 25 to about 35 weight percent, depending upon the specific aniline-to-formaldehyde molar ratio used in the polymaine preparation. Suitable polymeric isocyanates of this type for use in the practice of this invention are those available commercially as PAPI 901 (The Upjohn Company) and NIAX Isocyanate AFPI (Union Carbide Corporation).

Other useful polyisocyanate reactants include tolylene diisocyanate residues obtained from the manufacture of the 2,4- and 2,6- isomers of tolylene diisocyanates, and having a free —NCO content of from about 30 to about 50 weight percent. For example, as is known, tolylene diisocyanate is commercially made by reacting toluene and nitric acid to form the 2,4- and 2,6-dinitrotoluene isomers, hydrogenating and then phosgenating, typically in a solvent such as dichlorobenzene, to provide the conventional mixture of 80 per cent 2,4-tolylene diisocyanate and 20 percent 2,6-tolylene diisocyanate. After removal of the solvent, the crude product undergoes a further evaporation in a still, with the refined or pure tolylene diisocyanate coming over. The evaporator tails remaining are black in color and extremely viscous, often solid, materials. It is the evaporator tail material which is commonly referred to as tolylene diisocyanate residue.

Combinations of diisocyanates with polymeric isocyanates having an average of more than two isocyanate groups per molecule are also useful polyisocyanate reactants. Illustrative of such combinations are: a mixture of 2,4-tolylene diisocyante, 2,6-tolylene diisocyanate and the aforesaid polyphenylmethylene polyisocyanates and/or the aforementioned tolylene diisocyanate residue product.

The aforesaid types of polyisocyanate reactants are generally useful in forming cellular urethane polymers of the flexible, semi-flexible, high-resilience and rigid variety. For example, in regard to semi-flexible foam formulations, tolylene diisocyanates, tolylene diisocyanate residue and polymeric isocyanates are suitable. More usually, however, semi-flexible formulations contain the polymeric isocyanates such as PAPI, AFPI and the like. The more commonly employed polyisocyanates for rigid foam formulations are tolylene diisocyanate residue and polymeric isocyanates. For rigids, tolylene diisocyanates are also useful although they are usually employed for this purpose as quasi-prepolymers having a free —NCO content from about 25 to about 35 percent. In regard to high resilience formulations, polyisocyanates used with particular advantage are mixtures containing from about 60 to about 90 weight percent of the isomeric tolylene diisocyanates and from about 40 to about 10 weight percent of the polyphenylmethylene polyisocyanates, in order to enhance the average —NCO functionality and thus the reactivity of the reaction mixture. When the high-resilience formulations contain the isomeric diisocyanates as essentially the sole source of reactive —NCO, it is often desirable to include minor amounts of cross-linking agents, such as up to about 1.5 parts by weight per one hundred parts of polyol reactant.

On a combined basis, the polyol reactant and organic polyisocyanate usually constitute the major proportion by weight of the polyurethane-forming reaction mixture. In general, the polyisocyanate and polyol reactants are employed in relative amounts such that the ratio of total —NCO equivalents to total active hydrogen equivalent (of the polyol and any water, when used) is from 0.8 to 1.5, usually from 0.9 to 1.35, equivalents of —NCO per equivalent of active hydrogen. This ratio is known as the Isocyanate Index and is often also expressed as a percent of the stoichiometric amount of polyisocyanate required to react with total active hydrogen. When expressed as a percent, the Isocyanate Index may be from 80 to 150, and is usually within the range from about 90 to about 135. More usually, in flexible, semi-flexible and high resilience formulations the Isocyanate Index is no more than about 115.

The catalyst systems of the present invention are comprised of N,N-dimethylaminoalkoxypropionitriles either individually or in combination with another tertiaryamine component and/or an organic compound of tin. Thus, the catalyst systems employed in the practice of the invention may contain the N,N-dimethylaminoalkoxypropionitrile as essentially the sole type of catalytic component. The catalyst systems may also be binary systems in the sense of containing the N,N-dimethylaminoalkoxypropionitrile in combination with either at least one other tertiary-amine component or at least one organic compound of tin. Further, the catalyst systems may also be ternary in the sense of containing at least one other tertiary-amine component and, additionally, at least one organic compound of tin. In their use as components of cellular urethane formulations as described herein, the catalyst systems are present in the foam formulation in a catalytically effective amount. Thus, the total concentration thereof may vary over a relatively wide range such as from about 0.01 to about 12 or more parts by weight (exclusive of any carrier solvent or other noncatalytic additive) per one hundred parts by weight of the total polyol reactant (p.p.h.p.) contained in the reaction mixture. The more usual concentration is from about 0.05 to about 10 p.p.h.p. The particular concentration employed in any given formulation depends upon the nature of the intended foam product. For example, in flexible polyether and high-resilience foam formulations, the catalyst systems of the invention are usually employed in an amount from about 0.05 to about 4 p.p.h.p. In rigid and semi-flexible formulations, the catalyst systems may be used in amounts from about 0.1 up to about 12 p.p.h.p., although usually no more than about 10 p.p.h.p. is used.

Among the suitable classes of other tertiaryamines of which the catalyst systems of the invention may be comprised are tertiary-amines consisting of carbon, hydrogen and amino nitrogen. Such hydrocarbyl amines may contain one or more tertiary-amino groups such as up to about five, and from 3 to 24 and usually no more than 12 carbon atoms. Illustrative of suitable hydrocarbyl mono- and polyamines which may be employed as catalyst components of the N,N-dimethylaminoalkoxypropiontrile-containing catalyst systems of the invention are one or more of the following: trimethylamine; triethylamine; tributylamine; N,N-dimethylcyclohexylamine; N,N-dimethylbenzylamine; triethylenediamine; N,N,N',N'-tetramethylethylenediamine; N,N,N',N'-tetraethylethylenediamine; N,N,N',N'-tetramethyl-1,3-butanediamine; and 1,1,4,7,7-pentamethyldiethylenetriamine.

Another class of suitable tertiary-amines which may be present in the catalyst systems of the present invention are the beta-amino carbonyl compounds described in U.S. Pat. No. 3,821,131 such as, in particular, the 3-dialkylamino-N,N-dimethylpropionamides. Of this class, 3-dimethylamino-N,N-dimethylpropionamide is a particularly useful component of the catalyst systems described herein.

A third class of tertiary-amines for use as a catalytic component of the catalyst systems of this invention are bis[2-(N,N-dimethylamino)alkyl]ethers such as, in particular, bis[2-(N,N-dimethylamino)ethyl]ether ("BDMEE").

Also useful as an amine catalyst for use in combination with the N,N-dimethylaminoalkoxypropionitriles as described herein is distilled residue product formed in the manufacture of the aforementioned bis[2-(N,N-dimethylamino)ethyl]ether ("BDMEE") by the method of U.S. Pat. No. 3,957,875 which is incorporated herein by reference.

Other classes of tertiary-amines which may be used in combination with the N,N-dimethylaminoalkoxypropionitriles as described herein are: N,N-dialkylalkanolamines such as, in particular, N,N-dimethylethanolamine; the beta-aminopropionitriles described in the aforementioned U.S. Pat. No. 3,925,268, such as, in particular, 3-dimethylaminopropionitrile; and saturated heterocyclic tertiary-amines such as N-methylmorpholine; N-ethylmorpholine, 1,4-dimethylpiperazine and N-(2-hydroxyethylpiperazine.

Suitable organic tin compounds which may be contained in the catalyst systems of the invention are any of the following; stannous salts of carboxylic acids such as stannous oleate, stannous acetate and stannous laurate; dialkyltin dicarboxylates such as dibutyltin dilaurate, dibutyltin diacetate, dilauryltin diacetate, dibutyltin di(2-ethylhexanoate) and other such stannous and stannic salts as well as dialkyltin oxides, trialkyltin oxides, tin mercaptides such as, for example di-n-octyltin mercaptide, and the like.

When the N,N-dimethylaminoalkoxypropionitriles are used in combination with other catalysts, the components of the catalyst system may be added to foam formulation as individual streams or in preblended form.

In accordance with a more specific embodiment of the present invention, the catalyst systems of the abovedescribed binary or ternary type are provided and introduced to the foam formulation in preblended form. The blended catalyst systems of the invention usually contain: (1) a total of from about 10 to about 95 weight percent of the N,N-dimethylaminoalkoxypropionitrile component; (2) a total of from about 5 to about 90 weight percent of one or more of the abovedescribed other types of tertiaryamine components; and (3) from zero up to about 10 weight percent of the organic compound of tin.

For rigid foam formulations, particular advantage is realized in the employment of blends in which the organic compound of tin, especially dibutyltin dilaurate, is present. In such ternary catalyst systems of the invention, the tin compound may be present in an amount from about 0.1 to about 15 weight percent, the more usual concentration being from about 0.5 to about 10 weight percent. In addition to exhibiting good performance latitude in rigid foam formulations, such ternary blends are also effective catalyst systems for other types of formulations such as, for example, those designed for flexible polyether foam formation.

It is to be understood that the N,N-dimethylaminoalkoxypropionitriles, as well as the above-discussed blends based thereon, may be introduced to the foam formulations in undiluted form or as solutions in suitable carrier solvents or diluents. Commonly employed for this purpose are diethylene glycol, dipropylene glycol and hexylene glycol. Another type of suitable carrier medium for the catalyst systems described herein is organic surfactants which, when used, are usually of the non ionic variety. Such non ionics include: the polyoxyethylene ethers of higher alcohols having from 10 to 18 carbon atoms including mixtures thereof; and polyoxyethylene ethers of alkyl-substituted phenols. Typical of such non ionic organic surfactants for use as the carrier medium for the catalyst systems described herein are the ethylene oxide adducts of nonylphenol having the average composition $C_9H_{19}-C_6H_4-(OC_2H_4)_h-OH$, wherein $h$ has an average value from about 4 to about 20, inclusive of whole and fractional numbers, such as 6, 9, 10.5 and 15.

When used, the glycol and/or non ionic organic surfactant type of carrier may be present in the catalyst systems including the above-described blends, in a total amount from about 5 to about 90, and usually in a total amount no more than about 80, weight percent, based on the combined weight of the catalytic components, glycol and/or organic surfactant diluent. The extent of dilution depends primarily on the activity specifications of any given foam formulation.

The foam formulations employed in the practice of the present invention may also contain a minor amount of any of the organic compounds of tin described hereinabove with specific reference to their presence in blended catalyst systems of the invention. Of such organic compounds of tin, stannous octoate and dibutyltin dilaurate are especially effective. It is to be understood that, when used, the tin co-catalyst may be added to the formulation directly as a separate stream, as a component of the above-described catalyst systems of the invention, or by a combination of these two modes of addition. When used, such tin co-catalysts may be present in the formulation in a total amount from about 0.001 to about 3 parts by weight per 100 parts by weight of total polyol reactant. In flexible polyether foam formulations and, when used in semi-flexible foam systems, the organic compound of tin is usually present in a total amount from about 0.01 to about one p.p.h.p., and most preferably in an amount no more than about 0.6 p.p.h.p. For high-resilience formulations, the tin compound is generally used in an amount from about 0.001 up to about 2 p.p.h.p. When used in rigid foam formulations, the tin compound is generally present in the formulation in an amount of at least about 0.01. Although in some rigid systems up to about 3 p.p.h.p. may be used, as a general rule no more than about 2 p.p.h.p. of tin compound is present.

Foaming is accomplished by the presence in the foam formulation of varying amounts of a polyurethane blowing agent such as water which, upon reaction with isocyanate, generates carbon dioxide in situ, or throgh the use of blowing agents which are vaporized by the exotherm of the reaction, or by a combination of the two methods. These various methods are known in the art. Thus, in addition to or in place of water, other blowing agents which can be employed in the process of this invention include methylene chloride, liquefied gases which have boiling points below 80° F. and above −60° F., or other inert gases such as nitrogen, carbon dioxide added as such, methane, helium and argon. Suitable liquefied gases include aliphatic and cycloaliphatic fluorocarbons which vaporize at or below the temperature of the foaming mass. Such gases are at least partially fluorinated and may also be otherwise halogenated. Fluorocarbon agents suitable for use in foaming formulations of this invention include: trichloromonofluoromethane; dichlorodifluoromethane; 1,1-dichloro-1-fluoroethane; 1,2,2-trifluoro-1,1,2-trichloroethane; 1,1,1-trifluoro-2-fluoro-3,3-difluoro-4,4,4-trifluorobutane; hexafluorocyclobutene; and octafluorocyclobutane.

In general, the blowing agent is employed in an amount from about 1 to about 100 parts by weight per 100 parts by weight of total polyol reactant, the particular blowing agent and amount thereof depending upon the type of foam product desired. When water is used as the sole or as a partial source of blowing action, generally no more than about 10 p.p.h.p. of water is introduced to the foam system. Flexible polyether foam and highresilience foam are blown with water either as the sole source of blowing action or in combination with up to about 40 p.p.h.p. of fluorocarbon such as trichlorofluoromethane. Flexible foam formulations usually contain from about 1 to about 6 p.p.h.p. of water. The more usual water concentration for high-resilience foam systems is from about 1 to about 4 p.p.h.p. In semi-flexible foam systems, the more commonly employed blowing agent is water (usually from about 1 to about 3 p.p.h.p.), although up to about 10 p.p.h.p. of fluorocarbon may also be used. For rigid foam formulations, blowing action is supplied employing a fluorocarbon in a relatively high proportion such as from about 10 to about 100 (usually no more than 80) p.p.h.p., either as the sole type of agent or in combination with up to about 10 p.p.h.p. of water. When present in rigid foam systems, water is usually used in an amount no more than about 5 p.p.h.p. The selection and amount of blowing agent in any particular foam formulation is well within the skill of the cellular polyurethane art.

In producing cellular polyurethanes in accordance with the method of this invention, a minor amount of an organosilicone surfactant may also be present as an additional component of the polyurethane-forming reaction mixture. When used, such surfactants are present in the formulation in a foam-stabilizing amount, that is, in an amount sufficient to prevent collapse of the foam until the foamed product has developed sufficient strength to be self-supporting. Usually, foam-stabilizing amounts do not exceed about 5 parts by weight per 100 parts by weight of total polyol reactant. One class of especially useful stabilizers for flexible polyether-based polyurethane foam are the polysiloxane-poly(oxyethylene-oxypropylene) copolymers described in U.S. Pat. Re. No. 27,541. Also suitable are the branched copolymers described in U.S. Pat. No. 2,834,748. Particularly useful as foam-stabilizing components of flexible polyether urethane formulations contaning a flameretardant, are the cyanoalkyl-substituted polysiloxanepoly(oxyalkylene) copolymers described in U.S. Pat. No. 3,846,462. Illustrative of effective foam stabilizing components for high-resilience and semiflexible foam systems are the relatively low molecular weight particular class of organosilicones described in U.S. Pat. No. 3,741,917. When used in high-resilience and semi-flexible foam systems, the organosilicone component is usually present in an amount between about 0.025 and about 3 p.p.h.p. Illustrative of suitable surfactant components of rigid foam formulations are copolymers wherein the polyoxyalkylene blocks are hydroxylterminated such as those described in U.S. Pat. No. 3,600,418.

The catalyst systems described herein are also effective catalytic components of foam formulations containing a flame-retardant. The flame-retardants can be chemically combined in one or more of the other materials used (e.g., in the polyol or polyisocyanate), or they can be used as discrete chemical compounds added as such to the foam formulation. The flame-retardant may also be reactive with polyisocyanate and constitute a portion of the total organic polyol reactant contained in the formulation. In the use of flame-retardants of the chemically reactive variety, due regard should be given to the possible effect of the functionality of the compound on other properties (e.g., degree of flexibility) of the resulting foam. The organic flame-retardants preferably contain phosphorus or halogen, or both phosphorus and halogen. Usually, the halogen, when present, is chlorine and/or bromine. Illustrative of suitable flame-retardants of the discrete chemical compound variety are those disclosed in U.S. Pat. No. 3,846,462 (column 34, beginning with line 39, through column 35, line 12) the disclosure of which in this respect is incorporated as part of the present disclosure by reference thereto. Other suitable flame-retardants comprise halogen-containing polymeric resins such as polyvinylchloride resins in combination with antimony trioxide and/or other inorganic metal oxides such as zinc oxide, as described in U.S. Pat. Nos. 3,075,927; 3,075,928; 3,222,305; and 3,574,149. It is to be understood that other flameretardants known to the art may be used and that the aforesaid types may be employed individually or in combination with one another.

When used, the flame-retarding agent can be present in the foam formulations described herein in an amount from about 1 to about 45 parts by weight per 100 parts by weight of the polyol reactant, the particular amount employed depending largely on the efficiency of any given agent in reducing the burning extent of the foam product.

If desired, other additional ingredients can be employed in minor amounts in producing the polyurethane foams in accordance with the process of this invention. Illustrative of such additives that can be employed are: cross-linking agents such as glycerol, diethanolamine, triethanolamine and their oxyalkylene adducts; additives to enhance load-bearing properties; filters (e.g., calcium carbonate and barium sulfate which are often used in semi-flexible foam formulations); as well as dyes, pigments, anti-yellowing agents and the like.

In general, final or post-curing of the foam products produced in accordance with the method of this invention is achieved by allowing the foam to stand at ambient temperatures until a tack-free product is obtained, or by subjecting the foam to elevated temperatures up to about 500° F. in order to achieve more rapid curing. In those systems based on the more highly reactive polyol reactants such as those employed in producing high-resilience foams, a sufficiently high degree of curing is achieved during foam formation without the necessity of subjecting the foam to conventional high temperature (e.g., 300°–500° F.) post-curing procedures which are otherwise applied in the commercial manufacture of flexible foams from less highly reactive flexible foam formulations.

The polyurethane foams produced in accordance with the present invention are useful as cushioning material, mattresses, automotive interior padding, carpet underlay, packaging, gaskets, sealers, thermal insulators and other such well-known end-use applications.

The following examples are offered as further illustrative of the present invention and are not to be construed as unduly limiting the scope thereof.

The 3-(2-dimethylaminoethoxy)propionitrile (DMAEPN) employed in the examples was prepared as follows; A flask equipped with a magnetic stirrer and a reflux condenser was charged with N,N-dimethylethanolamine (335 grams, 3.76 moles). To this was added sodium methylate (4.6 grams), p-methoxyphenol (400 ppm) and phenothiazine (200ppm), Dropwise addition of acrylonitrile (200.6 grams, 3.78 moles) was initiated and the rate of addition was controlled to maintain the kettle temperature between 25°–50° C. After addition, the mixture was allowed to stir overnight. Sulfuric acid (8.4 ml.) was then added and the reaction mixture filtered to remove salts. The filtrate was distilled under reduced pressure. The product, DMAEPN, was recovered at 127° C./ 15–20 mm. Hg. Yield was 268 grams (50.3 percent of theory). Identity of the material was confirmed by comparative gas chromatographic analysis with an authentic sample. [Literature: boiling point=115°–115° C./14 mm. Hg. Chemical Abstracts, 49, 12461d (1955); A. R. Surrey, et al, Journal of American Chemical Society, 76, 4920 (1954)].

The 3-[2-(2-dimethylaminoethoxy)ethoxy]propionitrile (DMAEEPN) employed in the examples was prepared as follows: A flask equipped with a magnetic stirrer and a reflux condenser was charged with 2-(2-dimethylaminoethoxy)ethanol (266 grams, 2.0 moles), sodium methylate (2.45 grams) and p-methoxyphenol (0.1 grams). Dropwise addition of acrylonitrile (107 grams, 2.0 moles) was begun and the addition rate was controlled to maintain the kettle temperature below 50° C. After addition, the reaction mixture was allowed to stir overnight. After this time, the mixture was treated with sulfuric acid (4.5 grams) and filtered. The filtrate was fractionated under reduced pressure. The product, DMAEEPN, was recovered at 80° C,/0.2-0.4 mm. Hg. Yield was 120 grams or 32.3 per cent of theory. The nuclear magnetic resonance spectrum of the distilled fraction was consistent with the proposed structure. Combustion analysis of the material gave: C, 57.97%; H, 9.74%; and N, 14.87%. The calculated values for $C_9H_{18}N_2O_2$ are: C, 58.03%, H, 9.74%; and N, 15.04%.

Various terms, foam procedures and abbreviations repeatedly used or referred to in the examples are explained below:

DEFINITIONS OF TERMS

Breathability or Porosity is roughly proportional to the number of open cells in a foam, and was measured in accordance with the NOPCO breathability test procedure described by R. E. Jones and G. Fesman, "Journal of Cellular Plastics" (January 1967). It is a measure of air flow through a 2 × 2 × 1 foam sample and is expressed as standard cubic feet per minute (SCFM).

Cream Time deontes the interval of time from the formation of the complete foam formulation until the appearance of a creamy color in the formulation.

Rise Time refers to the interval of time from the formation of the complete foam formulation until the attainment of the apparent maximum height of the foam.

"p.p.h.p." = parts by weight of a given component per 100 parts by weight of total polyol reactant contained in the foam formulation.

"%" = percent.
"mm." = millimeters.
"ml." = milliliters.

Foaming Procedure I (Free-Rise Flexible Polyether Foam)

In accordance with this procedure, the polyether polyol reactant, silicone surfactant, catalyst and water are dispersed in predetermined relative proportions into a one-quart capacity container. A stainless steel baffle is inserted into the resulting polyol-containing mixture which is then mixed by means of a turbine blade operated at 2,000 revolutions per minute. Mixing is interrupted after 15 seconds and stannous octoate co-catalyst is added from a syringe. Mixing is then continued for an additional 15 seconds, adding the polyisocyanate reactant after the first 8 seconds of this second mixing period. After the mixing cycle, the mixture is poured into a supported container (12 × 12 × 12). The foam is allowed to rise and both the cream time and rise time are recorded. The foams are oven-cured at 120°–150° C. for 12–15 minutes after the rise is complete. A post-curing period of at least one day is allowed at room temperature before foam porosity is measured. [Under an alternate procedure, the polyol-containing mixture is mixed by means of a turbine blade operated at 2600 revolutions per minute, and the mixture is poured into a supported container (15 × 15 × 6).]

Foaming Procedure II (Free-Rise Rigid Foam)

The polyol, blowing agent (fluorocarbon and, when used, water) and catalyst or catalysts are weighed into a one-quart, circular cardboard cup. The container is stirred by hand to adjust the blowing agent to the proper level. The materials are then mixed for 10 seconds at 2,000 revolutions per minute. The polyisocyanate reactant containing the surfactant, is poured into the cup for 5 seconds. The total mixture is then mixed for an additional 5 seconds and then poured into an 8 × 8 × 6 cardboard box and allowed to rise. The cream, gel, tack-free and rise times are recorded and the foams are allowed to cure overnight before cutting and determination of physical properties such as density and closed cell content. In those instances where cold age shrinkage was determined, the foam samples (after the aforementioned overnight aging) were cut into cubes (2 × 2 × 2) which were then cold aged at minus 30° C. for a period of 16 to 24 hours. Volume contraction was measured by water displacement after cold aging.

In the first series of free-rise flexible polyether urethane foam preparations described under Examples 1 to 12, respective foam systems, designated herein as Foam Formulations A and B, were employed. The composition of these reaction mixtures is given in Table I which follows.

TABLE I

| FOAM FORMULATIONS A AND B | | |
|---|---|---|
| | Parts by Weight | |
| Components | A | B |
| Polyol A: A polyether triol having a Hydroxyl No. of 46, produced from glycerol, propylene oxide and ethylene oxide. | 100 | 100 |
| Polyisocyanate A: A mixture of the 2,4- and 2,6- isomers of tolylene diisocyanate present in a weight ratio of 80:20, respectively. (Index = 105) | 48 | 38 |
| Water | 4.0 | 3.0 |
| Stannous octoate | 0.3 | 0.3 |
| Surfactant A /1/ | 1.0 | 1.0 |
| Amine catalyst /2/ | Varied | |

/1/ A polysiloxane-polyoxyalkylene block copolymer having the average composition, $Me_3SiO(Me_2SiO)_n[MeO(C_3H_6O)_{30}(C_2H_4O)_{30}C_3H_6SiMeO]_5 SiMe_3$ where Me is methyl, employed as a 55 weight per cent active solution.
/2/ The specific amine catalysts and the concentration thereof are as given in Tables II and III, respectively.

EXAMPLES 1–6

In accordance with these examples, two series of water-blown urethane foams were prepared employing in one series 3-[2-dimethylaminoethoxy]propionitrile (DMAEPN), and in the second series 3-[2(2-dimethylaminoethoxy)ethoxy]propionitrile (DMAEEPN), as the respective sole amine catalyst component of Foam Formulation B (Table I). In each series, the amine catalyst was evaluated at three different concentrations, namely, 0.4, 0.6, and 0.8 p.p.h.p. For the purpose of comparision, another series of foams was prepared as Run Nos. C-1 to C-3 employing diemthylethanolamine (DMEA) at corresponding concentrations as the sole amine catalyst component of Foam Formulation B. In each of these foam preparations, Foam Procedure I was followed. The results are given in Table II which follows.

TABLE II

| FREE-RISE FLEXIBLE POLYETHER FOAM (3 parts Water) | | | | | | | | | |
|---|---|---|---|---|---|---|---|---|---|
| Example No. | — | 1 | 2 | — | 3 | 4 | — | 5 | 6 |
| Run No. | C-1 | — | — | C-2 | — | — | C-3 | — | — |
| Foam No. | 1 | 2 | 3 | 4 | 5 | 6 | 7 | 8 | 9 |
| Foam Formulation B[1] | | | | | | | | | |
| Amine Catalyst: | | | | | | | | | |
| DMEA[2], p.p.h.p. | 0.4 | — | — | 0.6 | — | — | 0.8 | — | — |
| DMAEPN[3], p.p.h.p. | — | 0.4 | — | — | 0.6 | — | — | 0.8 | — |
| DMAEEPN[4], p.p.h.p. | — | — | 0.4 | — | — | 0.6 | — | — | 0.8 |
| Amine N Content, p.p.h.p. × 100 | 6.3 | 3.9 | 3.0 | 9.4 | 5.9 | 4.5 | 12.6 | 7.9 | 6.0 |
| Cream Time, seconds | 10 | 14 | 13 | 8 | 11 | 9 | 6 | 8 | 7 |
| Rise Time, seconds | 105 | 110 | 103 | 86 | 95 | 84 | 80 | 83 | 77 |
| Porosity, SCFM | 2.1 | 2.5 | 2.0 | 3.0 | 3.4 | 4.2 | 3.8 | 4.2 | 4.1 |

[1]The other components are as defined in Table I.
[2]Dimethylethanolamine.
[3]3-(2-Dimethylaminoethoxy)propionitrile.
[4]3-[2-Dimethylaminoethoxy)ethoxy]propionitrile.

The results of Table II demonstrate that, relative to dimethylethanolamine (DMEA), the N,N-dimethylaminoalkoxypropionitriles, DMAEPN and DMAEEPN, exhibit greater activity as catalysts for foaming water-blown polyether foam when compared on a containe amino nitrogen basis. Thus in Examples 3 and 6 the rise times achieved with DMAEPN and DMAEEPN were 95 and 77 seconds, respectively, whereas, in Run C-1 with DMEA, the rise time was significantly longer (105 seconds) even though the amino and nitrogen contents provided by DMAEPN and DMAEEPN (0.059 and 0.060 p.p.h.p., respectively) were about the same as that provided by DMEA (0.63 p.p.h.p.). This enhancement in catalytic activity relative to that of DMEA is unexpected from the standpoint that DMAEPN and DMAEEPN have a higher molecular weight group bonded to the tertiary amino nitrogen atom, that is, $-CH_2CH_2OCH_2CH_2-N$ and $-CH_2CH_2OCH_2CH_2OCH_2CH_2-N$, versus $-CH_2CH_2OH$ in DMEA. If anything, DMAEPN and DMAEEPN would have bee expected to be slower catalysts than DMEA inasmuch as the longer nitrogen-bonded chains have, in effect, diluted the dimethylamino group.

EXAMPLES 7-12

In accordance with these examples, DMAEPN and DMAEEPN were employed as the respective sole catalyst components of Foam Formulations B (Table I) at three different concentrations, namely, 0.4, 0.6 and 0.8 p.p.h.p. For the purpose of comparision, 3-dimethylaminopropionitrile (DAPN) was employed as a standard at corresponding concentrations as the sole amine catalyst component of Foam Formulation BIn each of these foam preparations, Foam Procedure I was followed. The results ar given in Table III which follows.

p.p.h.p. of catalyst a rise time of 121 seconds as realized with DAPN (corresponding amino nitrogen content = 0.114 p.p.h.p.) whereas rise times of 83 and 77 seconds, respectively, were achieved with DMAEPN and DMAEEPN even though the latter catalysts provided much lower amino nitrogen contents (0.079 and 0.060 p.p.h.p., respectively). Further, when compared at about the same level of contained amino nitrogen, DAPN showed a rise time of 158 seconds for an amine content of 0.057 p.p.h.p., whereas DMAEPN and DMAEEPN showed rise times of 95 and 77 seconds for amino nitrogen contents of 0.059 and 0.060 p.p.h.p., respectively.

In addition, and as recognized in its use, 3 parts water Foam Formulation B is a more difficult reaction mixture to foam to a high porosity product than a corresponding 4 parts $H_2O$ system such as Foam Formulation A of Table I. It is noteworthy, therefore, that the foams produced with DMAEPN and DMAEEPN had significantly higher porosities than those produced with DAPN. For example, at 0.4 p.p.h.p. of catalyst a porosity of 1.1 SCFMA was realized with DAPNwhereas higher porosities of 2.5 and 2.0 were realized with DMAEPN and DMAEEPN, respectively. Likewise, at 0.6 p.p.h.p. of each catalyst a porosity of 0.9 SCFM was realized with DAPN whereas significantly higher porosities of 3.4 and 4.2, respectively, were achieved with

TABLE III

| | FREE-RISE FLEXIBLE POLYETHER FOAM (3 parts Water) | | | | | | | |
|---|---|---|---|---|---|---|---|---|
| Example No. | — | 7 | 8 | — | 9 | 10 | — | 11 | 12 |
| Run No. | C-4 | — | — | C-5 | — | — | C-6 | — | — |
| Foam No. | 10 | 11 | 12 | 13 | 14 | 15 | 16 | 17 | 18 |
| Foam Formulation B[1] | | | | | | | | | |
| Amine catalyst: | | | | | | | | | |
| DAPN[2], p.p.h.p. | 0.4 | — | — | 0.6 | — | — | 0.8 | — | — |
| DMAEPN[3], p.p.h.p. | — | 0.4 | — | — | 0.6 | — | — | 0.8 | — |
| DMAEEPN[4], p.p.h.p. | — | — | 0.4 | — | — | 0.6 | — | — | 0.8 |
| Amine N content, p.p.h.p. × 100 | 5.7 | 3.9 | 3.0 | 8.6 | 5.9 | 4.5 | 11.4 | 7.9 | 6.0 |
| Cream Time, seconds | 18 | 14 | 13 | 15 | 11 | 9 | 12 | 8 | 7 |
| Rise Time, seconds | 158 | 110 | 103 | 135 | 95 | 84 | 121 | 83 | 77 |
| Porosity, SCFM | 1.1 | 2.5 | 2.0 | 0.9 | 3.4 | 4.2 | 1.3 | 4.2 | 4.1 |

[1]The other components are as defined in Table I.
[2]3-Dimethylaminopropionitrile.
[3]3-(2-Dimethylaminoethoxy)propionitrile.
[4]3-[2-(2-Dimethylaminoethoxy)ethoxy]propionitrile.

The results of Table III demonstrate the unexpectedly higher catalytic activity of DMAEPN and DMAEEPN in providing water-blown polyether foam relative to dimethylaminopropionitrile when compared on either a parts by weight or contained amino nitrogen basis. Thus in Examples 7 and 8 the rise times achieved with DMAEPN and DMAEEPN were 110 and 103 seconds, respectively, whereas in Run C-4 with DAPN, the rise time was significantly longer (158 seconds) even though each catalyst was employed at 0.4 p.p.h.p. and even though the amino nitrogen contents provided by DMAEPN and DMAEEPN (0.039 and 0.030 p.p.h.p, respectively) were substantially lower than that provided by DAPN (0.057 p.p.h.p.). Also noteworthy is that at 0.6 p.p.h.p. of each catalyst a rise time of 135 seconds was realized with DAPN (corresponding amino nitrogen content = 0.086 p.p.h.p.) whereas rise times of 95 and 84 seconds were achieved with DMAEPN and DMAEEPN even though the latter catalysts provided much lower amino nitrogen contents (0.059 and 0.045 p.p.h.p., respectively). Likewise, at 0.8

DMAEPN and DMAEEPN. Further, when compared at about the same level of contained amino nitrogen, DAPN showed a porosity of 1.1 SCFM (corresponding amino nitrogen content = 0.057 p.p.h.p.) whereas porosities of 3.4 and 4.1 SCFM, respectively, were achieved with DMAEPN and DMAEEPN at comparable amino nitrogen contents of 5.9 and 6.0 p.p.h.p.

EXAMPLES 13-20

In accordance with these examples, 3-(2-dimethylaminoethoxy)propionitrile (DMAEPN) and 3-[2-(2-dimethylaminoethoxy)ethoxy]propionitrile (DMAEEPN) were employed as the respective sole catalyst components of Foam Formulation A (Table I) at four different concentrations, namely, 0.1, 0.2, 0.3 and 0.4 p.p.h.p. For the purpose of comparison, 3-dimethylaminopropionitirle (DAPN) is employed as a standard at concentrations of 0.25, 0.5, 0.75, and 1.0 p.p.h.p. In each of these foam preparations, Foam Procedure I was followed. The results are given in Table IV which follows.

TABLE IV

FREE-RISE FLEXIBLE POLYETHER FOAM (4 parts Water)

| Example No. | — | 13 | 14 | — | 15 | 16 | — | 17 | 18 | — | 19 | 20 |
|---|---|---|---|---|---|---|---|---|---|---|---|---|
| Run No. | C-7 | — | — | C-8 | — | — | C-9 | — | — | C-10 | — | — |
| Foam No. | 19 | 20 | 21 | 22 | 23 | 24 | 25 | 26 | 27 | 28 | 29 | 30 |
| Foam Formulation A[1] | | | | | | | | | | | | |
| Amine catalyst: | | | | | | | | | | | | |
| DAPN[2], p.p.h.p. | 0.25 | — | — | 0.5 | — | — | 0.75 | — | — | 1.0 | — | — |
| DMAEPN[3], p.p.h.p. | — | 0.1 | — | — | 0.2 | — | — | 0.3 | — | — | 0.4 | — |
| DMAEEPN[4], p.p.h.p. | — | — | 0.1 | — | — | 0.2 | — | — | 0.3 | — | — | 0.4 |
| Amine N content, p.p.h.p. × 100 | 3.6 | 1.0 | 0.8 | 7.2 | 2.0 | 1.5 | 10.7 | 3.0 | 2.3 | 14.3 | 3.9 | 3.0 |
| Cream Time, seconds | 8 | 8 | 8 | 7 | 8 | 8 | 7 | 7 | 7 | 6 | 6 | 6 |
| Rise Time, seconds | 103 | 94 | 93 | 100 | 90 | 86 | 95 | 81 | 81 | 91 | 77 | 76 |
| Porosity, SCFM | | 6.3 | 7.2 | | 6.4 | 7.1 | | 6.4 | 6.5 | | 6.0 | 5.6 |

[1] The other components are as defined in Table 1.
[2] 3-Dimethylaminopropionitrile.
[3] 3-(2-Dimethylaminoethoxy)propionitrile.
[4] 3-[2-(2-Dimethylaminoethoxy)ethoxy]propionitrile.

The results of Table IV further demonstrate that, relative to 3-dimethylaminopropionitrile (DAPN), the DMAEPN and DMAEEPN exhibit greater activity as catalysts for forming water-blown polyether urethane foam using 4 parts water Foam Formulation A when compared on either a parts by weight basis or a contained amino nitrogen basis. Thus, in Example C-7 where DAPN catalyst was employed at 0.25 p.p.h.p. the rise time was 103 seconds, whereas in Examples 15 and 16 the rise times for DMAEPN and DMAEEPN were 90 and 86 seconds, respectively, even though the DMAEPN and DDAEEPN were employed at the lesser concentration of 0.2 p.p.h.p. Also, when compared at about the same level of contained amino nitrogen a rise time of 103 seconds was realized with DAPN (corresponding amino nitrogen content = 0.036 p.p.h.p.) whereas significantly lower rise times of 77 and 76 seconds were achieved with DMAEPN and DMAEEPN (corresponding amino nitrogen contents of 0.039 and 0.030 p.p.h.p., respectively). This enhancement in catalytic activity is unexpected from the standpoint that DMAEPN and DMAEEPN have a higher molecular weight bonded to the tertiary amino nitrogen atom, as compared to DAPN, and they would be expected to be slower catalysts than DAPN inasmuch as the longer nitrogen-bonded chains have, in effect, diluted the dimethylamino group.

It is surprising that DMAEEPN provided about the same reactivity relative to DMAEPN despite the lower contained amino nitrogen content of DMAEEPN. Thus, DMAEPN provided rise times of 94, 90, 81, and 77 seconds at respective amino nitrogen contents of 0.010, 0.020, 0.030, and 0.039 p.p.h.p., respectively, whereas DMAEEPN provided rise times of 93, 86, 81 and 76 seconds at lower amino nitrogen contents of 0.008, 0.015, 0.023, and 0.030 p.p.h.p., respectively.

EXAMPLES 21-32

These examples illustrate the catalytic effectiveness of blends within the scope of the invention containing 3(2-dimethylaminoethoxy)propionitrile (DMAEPN) in combination with hydrocarbyl polyamindes referred to for brevity as "PMDETA" and "TMBDA" where:

PMDTA = 1,1,4,7,7 - pentamethyldiethylenetrimamine which has the formula,

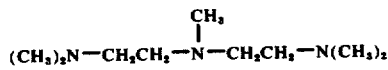

TMBDA = N,N,N',N' - tetramethyl-1,3-butanediamine which has the formula,

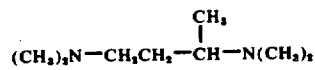

The blended catalysts of the invention are referred to herein as Blends I and II. For the purpose of comparision, the standard chosen for these foam preparations was a blend, designated Blend A, of BDMEE and DMEA where:

BDMEE = bis [2-(N,N-diemthylamino)ethyl]ether
DMEA = N,N-dimethylethanolamine

Blend A was employed in Run Nos. C-11 to C-16. The composition of comparative Blend A, and of Blends I and II of the invention, are given in the following Table V.

TABLE V

| | Component | Weight % |
|---|---|---|
| Blend A: | BDMEE | 33.3 |
| | DMEA | 66.7 |
| Blend I: | PMDETA | 55 |
| | DMAEPN | 45 |
| Blend II: | TMBDA | 55 |
| | DMAEPN | 45 |

In one series of foam preparations, that is, in Examples 21–26 and Run Nos. C-11 to C-13, the respective blends were used as the amine catalyst component of 4 parts water Foam Formulation A of Table I. In the second series, that is, in Examples 27–32 and Run Nos. C-14 to C-16, the respective blends were used as the amine catalyst component of 3 parts water Foam Formulation B which is also defined in Table I. In both series, Foam Procedure I was followed. The results are given in Tables VI and VII which follow.

TABLE VI

BLENDS OF DMAEPN WITH HYDROCARBYL POLYAMINES FOR WATER-BLOWN FLEXIBLE POLYETHER FOAM

| Example No. | — | 21 | 22 | — | 23 | 24 | — | 25 | 26 |
|---|---|---|---|---|---|---|---|---|---|
| Run No. | C-11 | — | — | C-12 | — | — | C-13 | — | — |

TABLE VI-continued

BLENDS OF DMAEPN WITH HYDROCARBYL POLYAMINES FOR WATER-BLOWN FLEXIBLE POLYETHER FOAM

| Foam No. | 31 | 32 | 33 | 34 | 35 | 36 | 37 | 38 | 39 |
|---|---|---|---|---|---|---|---|---|---|
| Foam Formulation A[1] | | | | | | | | | |
| Blend A[2], p.p.h.p. | 0.1 | — | — | 0.2 | — | — | 0.3 | — | — |
| Blend I[3], p.p.h.p. | — | 0.1 | — | — | 0.2 | — | — | 0.3 | — |
| Blend II[3], p.p.h.p. | — | — | 0.1 | — | — | 0.2 | — | — | 0.3 |
| Cream Time, seconds | 8 | 8 | 8 | 6 | 6 | 7 | 5 | 5 | 6 |
| Rise Time, seconds | 82 | 77 | 81 | 67 | 65 | 71 | 58 | 57 | 64 |
| Foam Porosity, SCFM | 1.8 | 2.7 | 2.2 | 3.3 | 4.5 | 3.9 | 3.8 | 5.0 | 4.5 |

[1] Four parts water system as defined in Table I.
[2] Not a blend of the present invention.
[3] As defined in Table V.

TABLE VII

BLENDS OF DMAEPN WITH HYDROCARBYL POLYAMINES FOR WATER-BLOWN FLEXIBLE POLYETHER FOAM

| Example No. | — | 27 | 28 | — | 29 | 30 | — | 31 | 32 |
|---|---|---|---|---|---|---|---|---|---|
| Run No. | C-14 | — | — | C-15 | — | — | C-16 | — | — |
| Foam No. | 40 | 41 | 42 | 43 | 44 | 45 | 46 | 47 | 48 |
| Foam Formulation B[1] | | | | | | | | | |
| Blend A[2], p.p.h.p. | 0.1 | — | — | 0.2 | — | — | 0.3 | — | — |
| Blend I[3], p.p.h.p. | — | 0.1 | — | — | 0.2 | — | — | 0.3 | — |
| Blend II[3], p.p.h.p. | — | — | 0.1 | — | — | 0.2 | — | — | 0.3 |
| Cream Time, seconds | 12 | 11 | 13 | 8 | 7 | 10 | 6 | 6 | 8 |
| Rise Time, seconds | 136 | 109 | 140 | 104 | 88 | 100 | 80 | 77 | 92 |
| Porosity, SCFM | 0.71 | 2.0 | 0.76 | 1.9 | 2.8 | 2.0 | 3.4 | 4.1 | 2.5 |

[1] Three parts water system as defined in Table I.
[2] Not a blend of the present invention.
[3] As defined in Table V.

The data of Tables VI and VII illustrate the utility of blends of DMAEPN with the generally more odoriferous hydrocarbyl polyamides such as TMBDA and PMDETA to produce well cured "one-shot" flexible polyether polyurethane foam with an acceptable processing time. The use of the relatively non-volatile DMAEPN as a blend component allows more volatile or odorous amine catalysts such as TMBDA and PMDETA to be employed for their catalytic activity while keeping catalyst vapors reduced. The data of Tables VI and VII also illustrate that the use of DMAEPN in combination with PMDETA as in Blend I, provides an amine catalyst system for water-blown polyether urethane foam formation having an especially good combination of catalytic activity and ability to provide open foam.

EXAMPLES 33–38

In these examples, free-rise rigid foams blown with a combination of fluorocarbon and water were prepared employing DMAEPN and DMAEEPN as the amine catalyst components of the foam-producing reaction mixture. The other components of the reaction mixture are as identified in Table VIII.

TABLE VIII

| Component | FOAM FORMULATIoN C Parts by Weight |
|---|---|
| Polyol B: A polyol having a Hydroxyl No. of about 400, derived from ethylene oxide and propylene oxide and a mixed starter containing sucrose, diethylenetriamine and aniline. | 100 |
| Polyisocyanate B: Contains (1) isocyanate having a free - NCO content of about 38.5 weight percent, produced as a residue product in the manufacture of the 2,4- and 2,6- isomers of tolylene diisocyanate, and (2) a silicone surfactant; the weight ratio of (1):(2) is 98:2. /1/ | 99.9 |
| Blowing Agent: | |
| Water | 1.5 |
| Trichlorofluoromethane | 45.0 |
| Catalyst System | Varied |

/1/ Surfactant component (2) is Silicone Surfactant L-5340 (Union Carbide Corporation)

In these examples, DMAEPN and DMAEEPN were employed as the sole catalysts of Foam Formulation C at 2.0 and 3.0 p.p.h.p. Foams were also prepared based on the use of dimethylethanolamine (Run Nos. C-17, -19 and -21) and triethylamine (Run Nos. C-18, -20 and -22) as the respective catalyst components of Foam Formulation C at corresponding concentrations of 1.0, 2.0 and 3.0 p.p.p.h. Each foam preparation followed Foaming Procedure II. The results are given in Table IX which follows.

TABLE IX

FREE-RISE RIGID POLYETHER FOAM BLOWN WITH WATER + FLUOROCARBON

| Example No. | — | — | 33 | 34 | — | — | 35 | 36 | — | — | 37 | 38 |
|---|---|---|---|---|---|---|---|---|---|---|---|---|
| Run No. | C-17 | C-18 | — | — | C-19 | C-20 | — | — | C-21 | C-22 | — | — |
| Foam No. | 49 | 50 | 51 | 52 | 53 | 54 | 55 | 56 | 57 | 58 | 59 | 60 |
| Foam Formulation C[1] | | | | | | | | | | | | |
| Amine catalyst: | | | | | | | | | | | | |
| DMEA[2], p.p.h.p. | 1.0 | — | — | — | 2.0 | — | — | — | 3.0 | — | — | — |
| TEA[3], p.p.h.p. | — | 1.0 | — | — | — | 2.0 | — | — | — | 3.0 | — | — |
| DMAEPN[4], p.p.h.p. | — | — | 2.0 | — | — | — | 3.0 | — | — | — | 4.0 | — |
| DMAEEPN[5], p.p.h.p. | — | — | — | 2.0 | — | — | — | 3.0 | — | — | — | 4.0 |

TABLE IX-continued

FREE-RISE RIGID POLYETHER FOAM BLOWN WITH WATER + FLUOROCARBON

| | | | | | | | | | | | | |
|---|---|---|---|---|---|---|---|---|---|---|---|---|
| Amino nitrogen content, p.p.h.p. | 0.16 | 0.14 | 0.20 | 0.15 | 0.31 | 0.28 | 0.30 | 0.23 | 0.47 | 0.42 | 0.39 | 0.30 |
| Cream time, seconds | 19 | 16 | 15 | 15 | 13 | 12 | 11 | 10 | 12 | 10 | 8 | 7 |
| Gel time, seconds | 135 | 146 | 98 | 96 | 82 | 113 | 71 | 82 | 66 | 79 | 65 | 70 |
| Tack free time, seconds | 140 | 140 | 112 | 116 | 94 | 113 | 72 | 90 | 74 | 84 | 70 | 86 |
| Rise time, seconds | 300 | 220 | 201 | 210 | 203 | 193 | 161 | 178 | 173 | 158 | 126 | 156 |
| Foam density, lb/cu. ft. | 1.34 | 1.35 | 1.29 | 1.29 | 1.34 | 1.24 | 1.23 | 1.25 | 1.24 | 1.27 | 1.29 | 1.24 |
| Closed cells, percent | 8.35 | 83.7 | 79.4 | 79.1 | 79.4 | 83.6 | 80.7 | 79.5 | 83.9 | 89.0 | 79.9 | 79.5 |

¹The other components are as defined in Table VIII
²Dimethylethanolamine
³Triethylamine
⁴3-(2-Dimethylaminoethoxy)propionitrile
⁵3-[2-(2-Dimethylaminoethoxy)ethoxy]propionitrile The data of Table IX further indicate that, relative to DMEA (as well as triethylamine), DMAEPN and DMAEEPN exhibit an enhanced reactivity when compared on a contained amino nitrogen basis. For example, in Example 37, DMAEPN provided an amino nitrogen content of 0.39 p.p.h.p. and a rise time of 126 seconds, whereas in runs C-21 and C-22, DMEA and TEA provided substantially slower rise times of 173 and 158 seconds, respectively, at amino nitrogen contents of 0.47 p.p.h.p. for DMEA and 0.42 p.p.h.p. for TEA. Similarly, in Example 38, DMAEEPN provided an amino nitrogen content of 0.30 p.p.h.p. and a rise time of 156 seconds, whereas in runs C-19 and C-20, DMEA and TEA provided rise times of 203 and 193 seconds, respectively, at comparable amino nitrogen contents of 0.31 p.p.h.p. for DMEA and 0.28 p.p.h.p. for TEA. It is also noted that both DMEAPN and DMAEEPN provided satisfactory cures and acceptable closed cell contents which are significant features of rigid urethane foam.

It is surprising that DMAEEPN provided reactivity which was comparable to that of DMAEPN despite the lower contained amino nitrogen content of DMAEEPN. For example, in Example 34, DMAEEPN provided an amino nitrogen content of 0.15 p.p.h.p. and a rise time of 210 seconds, whereas in Example 33, DMAEPN provided a greater amino nitrogen content of 0.20 p.p.h.p. and a rise time of 201 seconds. For all water-plus-fluorocarbon blown foams, these rise times are about the same.

EXAMPLES 39–41

In accordance with these examples, 3-(2-dimethylaminoethoxy)propionitrile (DMAEPN) was employed as the sole amino catalyst of an all fluorocarbon-blown rigid foam formulation. The particular reaction mixture employed is designated as Foam Formulation D and contained the components given in Table X.

TABLE X

| FOAM FORMULATION D | |
|---|---|
| Component | Parts by Weight |
| Polyol B /1/ | 100 |
| Polyisocyanate B /1/ | 99.9 |
| Blowing Agent: | |
| Water | 0.0 |
| Trichlorofluoromethane | 56.4 |
| Catalyst system | Varied |

/1/ Same as in Foam Formulation C of Table VIII

The rigid foams of these examples were prepared following free-rise Foaming Procedure II, employing DMAEPN at a concentration of 1.0, 2.0 and 3.0 p.p.h.p., respectively. Another series of all fluorocarbon-blown rigid foams was provided following Foaming Procedure II employing 3-(2-dimethylaminoethoxy)-propionitrile (DMAEPN) as the sole amine catalyst component of Foam Formulation D, also at 1.0, 2.0 and 3.0 p.p.h.p. (Run Nos. C-23 to C-25, respectively). The results are given in Table XI which follows.

TABLE XI

ALL FLUOROCARBON-BLOWN FREE-RISE RIGID POLYETHER FOAM

| Example No. | — | 39 | — | 40 | — | 41 |
|---|---|---|---|---|---|---|
| Run No. | C-23 | — | C-24 | — | C-25 | — |
| Foam No. | 61 | 62 | 63 | 64 | 65 | 66 |
| Foam Formulation D¹ | | | | | | |
| Amine catalyst: | | | | | | |
| DMEA², p.p.h.p. | 1.0 | — | 2.0 | — | 3.0 | — |
| DMAEPN³, p.p.h.p. | — | 1.0 | — | 2.0 | — | 3.0 |
| Amino nitrogen content, p.p.h.p | 0.16 | 0.098 | 0.31 | 0.20 | 0.47 | 0.30 |
| Cream time, seconds | 24 | 26 | 15 | 20 | 11 | 16 |
| Gel time, seconds | 184 | 205 | 115 | 146 | 90 | 105 |
| Tack-free time, seconds | 202 | 270 | 120 | 180 | 95 | 107 |
| Rise time, seconds | 278 | 300 | 186 | 261 | 175 | 193 |
| Foam density, lbs/cu. ft. | 1.54 | 1.48 | 1.44 | 1.49 | 1.38 | 1.50 |
| Closed cells, percent | 86.8 | 85.5 | 88.1 | 86.8 | 87.2 | 84.6 |

¹The other components are defined in Table X.
²Dimethylethanolamine
³3-(2-Dimethylaminoethoxy)propionitrile The results of Table XI illustrate the utility of 3-(2-dimethylaminoethoxy)propionitrile (DMAEPN) as a catalyst in forming all fluorocarbon-blown rigid foam having an acceptable closed cell content. As discussed, with specific reference to the rigid foam data of Table IX, DMAEPN exhibits enhanced reactivity as a catalyst for forming rigid foam blown with fluorocarbon and water relative to DMEA when compared on a contained aminonitrogen basis. On the other hand, the data of Table XI indicates that when the blowing agent does not comprise water, DMAEPN appears to have activity which is comparable to that of DMEA when compared on a contained amino nitrogen basis. For example, when compared at about the same amino nitrogen content as in the case of Example 41 (0.30 p.p.h.p. as DMAEPN) and run C-24 (0.31 p.p.h.p. as DMEA), the respective rise times are 193 and 186 seconds which for all fluorocarbon-blown rigid foam preparations may be considered about the same.

EXAMPLES 42–48

In accordance with these examples, blended catalyst systems of the invention were evaluated for their performance in forming rigid foams blown with fluorocarbon only and fluorocarbon in combination with water. The particular catalysts of these examples comprised DMAEPN, N,N,N',N'-tetramethylethylenediamine ("TMEDA"), and 1,1,3,7,7-pentamethyldiethylenetriamine ("PMDETA") as binary blends or in further combination with dibutyltin dilaurate ("DBTDL"); their composition is given in Table XII which follows.

TABLE XII

| | Component | Weight % |
|---|---|---|
| Blend III | DMAEPN[1] | 75 |
| | TMEDA[2] | 25 |
| Blend IV | DMAEPN | 60 |
| | TMEDA | 40 |
| Blend V | DMAEPN | 75 |
| | PMDETA[3] | 25 |
| Blend VI | DMAEPN | 72 |
| | TMEDA | 25 |
| | DBTDL[4] | 3 |
| Blend VII | DMAEPN | 72 |
| | PMDETA | 25 |
| | DBTDL | 3 |

[1]3-(2-dimethylaminoethoxy)propionitrile
[2]N,N,N',N'-tetramethylethylenediamine
[3]1,1,3,7,7-pentamethyldiethylenetriamine
[4]dibutyltindilaurate In Examples 42–45, Blends III, IV, V, and VI were employed as the catalyst system of partially water-blown rigid Foam Formulation C. The results are given in Table XIII which also includes corresponding data as Run No. C-26 based on a 33 weight percent solution of triethylenediamine. In Examples 46–48, Blends III, VI, and VII were employed as the catalyst system of all fluorocarbon-blown rigid Foam Formulation D; these results are given in Table XIV below which also include data as Run Nos. C-27 to C-29, based on the aforementioned solution of triethylenediamine.

TABLE XIII

BLENDS CONTAINING DMAEPN FOR WATER + FLUOROCARBON RIGID FORM

| Example No. | — | 42 | 43 | 44 | 45 |
|---|---|---|---|---|---|
| Run No. | C-26 | — | — | — | — |
| Foam No. | 67 | 68 | 69 | 70 | 71 |
| Foam Formulation C[1] | | | | | |
| Catalyst System: | | | | | |
| TEDA,p.p.h.p.[2] | 1.0 | — | — | — | — |
| Blend III,p.p.h.p.[3] | — | 2.0 | — | — | — |
| Blend IV,p.p.h.p.[3] | — | — | 1.0 | — | — |
| Blend V,p.p.h.p.[3] | — | — | — | 3.0 | — |
| Blend VI,p.p.h.p.[3] | — | — | — | — | 1.5 |
| Cream time, seconds | 17 | 14 | 15 | 7 | 8 |
| Gel time, seconds | 110 | 81 | 84 | 71 | 70 |
| Tack-free time, seconds | 125 | 85 | 88 | 71 | 77 |
| Rise time, seconds | 232 | 176 | 154 | 152 | 130 |
| Foam density, lbs/cu.ft. | — | 1.25 | 1.26 | 1.23 | 1.23 |
| Closed cells, percent | — | 86.1 | 85.7 | 84.5 | 84.3 |

[1]The other components are as defined in Table VIII.
[2]A 33 weight percent solution of triethylenediamine in dipropylene glycol.
[3]As defined in Table XII.

TABLE XIV

BLENDS CONTAINING DMAEPN FOR ALL FLUOROCARBONS BLOWN RIGID FOAM

| Example No. | — | — | — | 46 | 47 | 48 |
|---|---|---|---|---|---|---|
| Run No. | C-27 | C-28 | C-29 | — | — | — |
| Foam No. | 72 | 73 | 74 | 75 | 76 | 77 |
| Foam Formulation D[1] | | | | | | |
| Catalyst System: | | | | | | |
| TEDA,p.p.h.p.[2] | 1.0 | 2.0 | 3.0 | — | — | — |
| Blend III, p.p.h.p.[3] | — | — | — | 3.0 | — | — |
| Blend VI,p.p.h.p.[3] | — | — | — | — | 2.0 | — |
| Blend VII,p.p.h.p.[3] | — | — | — | — | — | 2.0 |
| Cream time, p.p.h.p. | 20 | 13 | 5 | 10 | 15 | 14 |
| Gel time,p.p.h.p. | 105 | 70 | 48 | 74 | 76 | 81 |
| Tack-free time, seconds | 140 | 77 | 50 | 78 | 96 | 99 |
| Rise time,p.p.h.p. | 214 | 150 | 95 | 121 | 153 | 186 |
| Density, lbs/cu.ft. | 1.46 | 1.41 | 1.36 | — | 1.43 | — |
| Closed cells, percent | 85.1 | 87.7 | 85.8 | — | 88.2 | — |

[1]The other components are as defined in Table X.
[2]A 33 weight percent solution of triethylenediamine in dipropylene glycol.
[3]As defined in Table XII.

Preliminary to the discussion of the data of Tables XIII and XIV, it is noted that the triethylenediamine solution used as a standard in Run Nos. C-26 to C-29 is a widely used amine catalyst in the commercial manufacture of both partially water-blown and all fluorocarbon-blown rigid foam. The objective, therefore, is to provide catalysts, the performance of which in all fluorocarbon-blown systems at least approaches that of commercially employed catalyst such as the aforementioned solution of triethylenediamine and which, at the same time, are not too active when used to catalyze rigid foam formulations partially blown with water. In other words, a catalyst which may exhibit good performance in forming rigid foam partially blown with water may not exhibit the same relative performance in all fluorocarbon-blown systems and, conversely, a catalyst which may show excellent reactivity in all fluorocarbon-blown systems may be too active a catalyst when used to form partially water blown rigid foam.

With specific reference to the results of Tables XIII and XIV, it is seen that the performance of Blend VI of the invention in forming all fluorocarbon-blown rigid foam was about the same as that of the triethylenediamine solution employed in the formation of all fluorocarbon-blown foam as given in Run C-28, and although performance surpassed that of the standard in forming partially water-blown foam in Example 45 of Table XIII, Blend VI was not too active in this respect. It is also noted that the use of Blend VI, as in Examples 45 and 47, introduced a low level (0.06 p.p.h.) of dibutyltindilaurate to the foam-producing reaction mixture, and provided a foam having an acceptable closed cell content. It is evident, therefore, that catalyst systems of the invention comprising DMAEPN in combination with dibutyltindilaurate and either N,N,N',N'-tetramethylethylenediamine (TMEDA) or 1,1,3,7,7-pentamethyldiethylenetriamine (PMDETA) provide an especially good combination of catalytic activity while keeping odorous catalyst vapors reduced.

EXAMPLES 49–51

The purpose of these examples is to demonstrate the efficacy of illustrative catalyst systems of the present invention in forming molded rigid foam under simulated flow characteristics encountered in actual manufacture pf refrigeration foam. For this purpose, a standard test, known as the "L-panel" test, was followed. In this test, the foam formulation is placed in a heated mold after mixing and is allowed to rise. The mold is comprised of a lower section (10 inches × 16.7 inches × 1 inch) and an upper section (24 inches × 10 inches × 1 inch) positioned at a right angle to the first; hence the term L-panel. The foam formulation is poured into the lower mold section and is allowed to rise up into the upper part. In so doing, the foaming mass must accomplish a right angle turn and enter the back panel. Critical to the production of good foam is the balance of reactivity to allow the mass to enter the upper part of the mold before complete gelation. Gelation too soon creates stress lines at the angular construction and results in separation and other structural deficiencies. Once the foam has entered the back cavity, the height of the foam rise therein is a measure of the final activity. If maximum rise is reached too early, high overall density will be obtained and more charge will be required to fill any given cavity. Another measure of reaction balance is the angular deformation on cold aging. In this test, a cured L-panel foam (allowed to cure overnight at room temperature) is cut so as to provide an L-shaped section about 6 inches wide with each leg about 6 inches long. These samples are placed in a freezer at minus 30° C and allowed to remain overnight. After this time, the angular deformation is measured. The smaller angular deformation indicates a better cold age stability.

The particular catalyst system employed in forming the L-panels of these examples contained DMAEPN and N,N,N',N'-tetramethylenediamine (TMEDA) as the amine component of a ternary catalyst system containing dibutyltin dilaurate (above-described Blend VI).

In Examples 49–51, Blend VI was employed as the catalyst system of Foam Formulation C (Table VIII) at concentrations of 1.0, 1.5, and 2.0 p.p.h.p., respectively. As standards for the performance of the catalyst systems of the invention, L-panels were also prepared employing a 33 weight percent solution of triethylenediamine (Run Nos. C-30 to C-32) and N,N-dimethylcyclohexylamine (Run Nos. C-33 to C-35), as the respective catalysts of Foam Formulation C at 1.0, 1.5 and 2.0 p.p.h.p. In each foam preparation, the above-described L-panel mold was used and the same manipulative steps were followed. Thus, in the examples and C runs, the L-panel mold was waxed lightly with mold release agent and placed in an oven at about 150° C. When the mold temperature was about 150° C, it was removed and allowed to cool to about 120° C. The foam components were mixed following the mixing procedure described under Foaming Procedure II. The mix was then poured into the L-panel mold at a mold temperature of 120° C. Clamps were placed and the mold kept at ambient temperature until foam rise was complete (less than 5 minutes). The mold was then placed in the oven for about 5 minutes, then removed and allowed to cool. Foams were demolded after a 10-minute cooling period. Foam characteristics such as cream, gel, tack-free and rise times were determined on the foam residue remaining in the cup in which the components were mixed. These measurements are given in Table XV which also includes the height of rise (in millimeters) and the overall density of the molded L-panel shaped foams as well as their angular deformation on cold aging at mius 30° C. Flowability in all of the molded samples was good and no separations or pockets were observed. Table XV follows.

TABLE XV

BLENDED CATALYSTS COMPRISING DMAEPN FOR MOLDED RIGID FOAM BLOWN WITH FLUOROCARBON + WATER

| Example No. | — | — | — | — | — | — | 49 | 50 | 51 |
|---|---|---|---|---|---|---|---|---|---|
| Run No. | C-30 | C-31 | C-32 | C-33 | C-34 | C-35 | — | — | — |
| Foam No. | 78 | 79 | 80 | 81 | 82 | 83 | 84 | 85 | 86 |
| Foam Formulation C[1] | | | | | | | | | |
| Catalyst system: | | | | | | | | | |
| TEDA[2] p.p.h.p. | 1.0 | 1.5 | 2.0 | — | — | — | — | — | — |
| DMCHA[3], p.p.h.p. | — | — | — | 1.0 | 1.5 | 2.0 | — | — | — |
| Blend VI[4], p.p.h.p. | — | — | — | — | — | — | 1.0 | 1.5 | 2.0 |
| Cream time, seconds | 15 | 13 | 10 | 15 | 13 | 8 | 15 | 13 | 11 |
| Gel time, seconds | 136 | 86 | 66 | 105 | 85 | 60 | 100 | 74 | 62 |
| Tack-free time, seconds | 140 | 90 | 70 | 123 | 96 | 66 | 107 | 80 | 74 |
| Rise time, seconds | 188 | 170 | 130 | 191 | 158 | 146 | 170 | 145 | 134 |
| Height of rise, mm. | 45.1 | 46.2 | 43.6 | 46.0 | 46.0 | 46.6 | 43.2 | 46.8 | 46.8 |
| Overall density, lbs./cu. ft. | 1.67 | 1.66 | 1.73 | 1.66 | 1.65 | 1.66 | 1.71 | 1.65 | 1.64 |
| Angular deformation on cold aging | 15 | 26 | 44 | 11 | 31 | 30 | 29 | 45 | 40 |

[1]The other components are as defined in Table VIII.
[2]Triethylenediamine employed as a 33 weight percent solution on dipropylene glycol.
[3]N,N-dimethylcyclohexylamine.
[4]As defined in Table XII.

The data of Table XV indicate the good performance of the catalyst system of the invention in providing molded refrigeration foam. It is noted that Blend VI compared favorably with triethylenediamine (TEDA) at 2.0 p.p.h.p. in regard to the angular deformation on cold aging (40 in Example 51 versus 44 in Run C-32). However, relative to N,N-dimethylcyclohexylamine (DMCHA) which is employed commercially for the manufacture of refrigeration foam, Blend VI provided molded foam having an increased angular deformation; the angular deformation of the foams obtained with Blend VI were 29, 45 and 40 versus 11, 31 and 30 with DMCHA. These cold age stability levels for Blend VI are acceptable relative to the commercially employed DMCHA. It is evident that the catalyst systems of the present invention exhibit good performance for molded refrigeration foam relative to the more highly odorous catalyst, DMCHA, employed in commercial practice.

EXAMPLES 52–55

The purpose of these examples was to determine the efficacy of DMAEPN and DMAEEPN in providing molded semi-flexible foam which is free of voids. For this purpose, DMAEPN and DMAEEPN were employed as the sole catalyst components of a semi-flexible foam system, designated Foam Formulation E, the organic polyol component of which was comprised of a polymer/polyether polyol. The composition of this formulation is given in Table XVI which follows.

TABLE XVI

| FOAM FORMULATION E | |
|---|---|
| Component | Parts By Weight |
| Polyol C: An ethylene oxide-capped glycerol started poly(oxypropylene) triol having a Hydroxyl No. of about 34, a molecular weight of about 5000, and a primary hydroxyl content of 70–75 mole percent. | 5 |
| Polyol D: A polymer/polyether polyol having a Hydroxyl No. of about 28 and based on (parts by weight): styrene (10), acrylonitrile (10) and Polyol C (80), produced by polymerizing said monomers in Polyol C. | 95 |
| Polyisocyanate C: A polyphenyl-methylene polyisocyanate having an average -NCO functionality of 2.6 and free -NCO content of 31.2 weight percent. | Index 100 |
| Water | 1.5 |
| Surfactant D /1/ | 1.5 |
| Filler | 0 |
| Amine catalyst | Varied |

/1/ A polysiloxane oil having the average composition, Me$_3$SiO(Me$_2$SiO)$_x$[MeO(C$_3$H$_6$O)$_n$C$_4$H$_8$SiMeO]$_{x-5}$SiMe$_3$ where Me is methyl, employed as a 10 weight percent solution in Polyol C.

In addition to DMAEPN and DMAEEPN, other catalysts evaluated as the respective catalyst components of Foam Formulation E were triethylenediamine as a 33 weight percent active solution and dimethylethanolamine. The same procedure was applied in each foam preparation and entailed the following manipulative steps.

Foam Procedure for Molded Semi-Flexible Foam

The polyol is weighed into a one-quart cup and, except for the blowing agent and polyisocyanate, the other ingredients are added to the polyol while mixing at 1000 revolutions per minute. After the last ingredient is added, mixing is continued for 5 minutes, also at 1000 r.p.m. The polyol master is conditioned to 80° F.±2°. Blowing agent is added followed by the addition of the polyisocyanate reactant which is also preconditioned to 80° F.±2°. Mixing is then started immediately at 2500 to 3000 r.p.m. and is continued for 10 seconds with vigorous circular motions of the cup. The system is then poured immediately into a standard baffled test mold. Systems which perform well in this test, flow enough to fill the mold and cure in a manner which produces a foam pad free from voids. In addition, acceptable systems should not yield molded parts which show excessive shrinkage after demolding or which cream so fast as to be impractical.

Following the above procedure, in addition to DMAEPN and DMAEEPN (at concentrations from 1.0 to 1.5 p.p.h.p.), dimethylethanolamine (0.5 to 1.5 p.p.h.p.) and triethylenediamine (0.5 to 2.0 p.p.h.p. as a 33 weight percent solution) were also employed as the respective amine components of Foam Formulation E. In each series, the results obtained at the lower and upper concentrations of the indicated respective ranges were deficient and, except for DMAEPN and DMAEEPN, the results obtained with the other two catalysts at intermediate concentrations were also deficient. The results are summarized in Table XVII which follows.

TABLE XVII

| MOLDED SEMI-FLEXIBLE POLYETHER FOAM (NO FILLER) | | | | | | | | | | |
|---|---|---|---|---|---|---|---|---|---|---|
| Example No. | — | — | — | — | — | — | 52 | 53 | 54 | 55 |
| Run No. | C-36 | C-37 | C-38 | C-39 | C-40 | C-41 | — | — | — | — |
| Foam No. | 87 | 88 | 89 | 90 | 91 | 92 | 93 | 94 | 95 | 96 |
| Form Formulation E /1/ | | | | | | | | | | |
| Amine catalyst: | | | | | | | | | | |
| TEDA /2/,p.p.h.p. | 0.5 | 1.5 | 1.75 | 2.0 | — | — | — | — | — | — |
| DMEA /3/,p.p.h.p. | — | — | — | — | 0.5 | 1.5 | — | — | — | — |
| DMAEPN /4/,p.p.h.p. | — | — | — | — | — | — | 1.0 | 1.5 | — | — |
| DMAEEPN /5/,p.p.h.p. | — | — | — | — | — | — | — | — | 1.0 | 1.5 |
| Foam Cured | No | Yes | Yes | Yes | No | Yes | Yes | Yes | Yes | Yes |
| Foam Shrinkage | No | No | No | No | No | Yes | No | No | No | No |
| Foam Voids | Yes | Yes | Yes | Yes | Yes | Yes | No | No | No | No |
| Type of Voids | | Large | | /6/ | /7/ | /6/ | — | — | — | — |
| Processability | OK | OK | OK | /8/ | — | — | OK | OK | OK | OK |

/1/ The other components are as defined in Table XVI.
/2/ A 33 weight percent solution of triethylenediamine in dipropylene glycol.
/3/ Dimethylethanolamine.
/4/ 3-(2-Dimethylaminoethoxy)propionitrile.
/5/ 3-[2-(2-Dimethylaminoethoxy)ethoxy]propionitrile.
/6/ Slight.
/7/ Moderate.
/8/ Creams too fast; required cooling of mix prior to pouring into mold.

The results of Table XVII indicate that at 1.0 and 1.5 p.p.h.p. DMAEPN produced an excellent foam free from voids. The DMAEPN produced a well cured, open foam having an excellent skin for purposes of demolding. The pressure profiles for the foam produced with DMAEPN were very low, and there was no corresponding shrinkage in the foam. Likewise, DMAEEPN produced an excellent foam free from shrinkage and voids at 1.0 and 1.5 p.p.h.p. As also summarized in Table XVII, DMEA provided voids and a slightly undercured foam at low concentration (Run C-40) and, although increasing the concentration provided a satisfactory cure and reduced voids considerably (Run C-70), the foam pad was not void free and slight shrinkage of the demolded foam occurred. As further recorded in Table XVII, the triethylenediamine solution employed in Runs C-36 to C-39, provided a foam pad at 0.5 p.p.h.p. which was undercured and showed large voids and, at 2.0 p.p.h.p., the system creamed so fast under the standard test condition that it required cooling to allow pouring into the mold. At 1.5 and 1.7 p.p.h.p. (Runs C-37 and -38), even though cure was improved, the molded foam pad still had large voids and, due to the high blowing efficiency of triethylenediamine, the surface of the pads was torn apart.

EXAMPLES 56-59

In accordance with these examples, DMAEPN and DMAEEPN were employed as the sole amine component of a semi-flexible foam system containing a relatively high content of calcium carbonate as a filler. The composition of the foam system, designated Foam Formulation F, is given in the following Table XVIII.

TABLE XVIII

| FOAM FORMULATION F | |
|---|---|
| Component | Parts by Weight |
| Polyol C /1/ | 40 |
| Polyol D /1/ | 60 |
| Polyisocyanate C /1/ | Index 100 |
| Water | 1.5 |
| Surfactant D /1/ | 1.5 |
| Filler (calcium carbonate) | 20 |
| Amine catalyst | Varied |

/1/ Same as in Formulaton E of Table XVI.

Foams were also prepared employing dimethylethanolamine (Runs C-42 and C-43) as the amine component of Foam Formulation F. Each foam preparation followed the procedure described under Examples 52 to 55, employing the same baffled test mold. The catalyst concentration and results are given in Table XIX which follows.

TABLE XIX

MOLDED SEMI-FLEXIBLE POLYETHER FOAM CONTAINING FILLER

| Example No. | — | — | 56 | 57 | 58 | 59 |
|---|---|---|---|---|---|---|
| Run No. | C-42 | C-43 | — | — | — | — |
| Foam No. | 97 | 98 | 99 | 100 | 101 | 102 |
| Foam Formulation F /1/ | | | | | | |
| Amine catalyst: | | | | | | |
| DMEA /2/,p.p.h.p. | 0.5 | 1.5 | — | — | — | — |
| DMAEPN /3/,p.p.h.p. | — | — | 1.0 | 1.5 | — | — |
| DMAEEPN /4/,p.p.h.p. | — | — | — | — | 1.0 | 1.5 |
| Foam Cured | No | Yes | Yes | Yes | yes | Yes |
| Foam Shrinkage | No | Yes | No | No | No | No |
| Foam Voids | Yes | Yes | No | No | No | No |
| Type of Voids | 151 | 161 | — | — | — | — |
| Processability | — | — | OK | OK | OK | OK |

/1/ The other components are as defined in Table XVIII.
/2/ Dimethylethanolamine.
/3/ 3-(2-Dimethylaminoethoxy)propionitrile.
/4/ 3-[2-(2-Dimethylaminoethoxy)ethoxy]propionitrile.
/5/ Moderate.
/6/ Slight.

The results of Table XIX further demonstrate that, relative to dimethylethanolamine, DMAEPN and DMAEEPN exhibit unique properties in their ability to provide molded semi-flexible filled foam which is free of voids and does not shrink upon demolding.

EXAMPLES 60-64

These examples illustrate the utility of DMAEPN- and DMAEEPN-containing systems of the invention as components of a high-resilience foam formulation comprising a polymer/polyether polyol. The foam procedure for molded high-resilience foam is given below. The composition of the high-resilience foam system employed is given in Table XX which follows.

TABLE XX

| FOAM FORMULATION G | Parts by Weight |
|---|---|
| Polyol C /1/ | 60 |
| Polyol D /1/ | 40 |
| Polyisocyanate D: A mixture of: 80 weight percent of the 2,4- and 2,6- isomers of tolylene diisocyanate, the weight ratio of said isomers being 80:20, respectively; and (2) 20 weight percent of a polyphenylmethylene polyisocyanate having an average -NCO functionality of 2.7 and a free -NCO content of 30.5–32.3 weight percent. | Index 107 |
| Water | 2.6 |
| Dibutyltin dilaurate | 0.015 |
| Surfactant D /1/ | 1.65 |
| Amine Catalyst System | |
| Amine Catalyst A A 33 weight percent solution of 3-dimethylamino-N,N-dimethylpropionamide in TERGITOL TP-9. | 0.30 |
| Amine Catalyst B A 33 weight percent solution of triethylenediamine in dipropylene glycol. | Varied |
| Amine Catalyst C A 70 weight percent solution of bis[2-(N,N-dimethylamino)-ethyl]ether in dipropylene glycol. | Varied |
| Other Amine Catalysts | |
| PMDETA /2/ | Varied |
| TMBDA /3/ | Varied |
| DMAEPN /4/ | Varied |
| DMAEEPN /5/ | Varied |

/1/ As defined in Table XXXVI.
/2/ 1,1,4,7,7-pentamethyldiethylenetriamine.
/3/ N,N,N',N'-Tetramethyl-1,3-butanediamine.
/4/ 3-(2-Dimethylaminoethoxy)propionitrile.
/5/ 3-[2-(2-Dimethylaminoethoxy)ethoxy]propionitrile.

Foam Procedure for Molded High-Resilience Foam

An aluminum mold (4.5 × 15 × 15) is prepared by first waxing lightly with Brulin Permamold Release Agent and then pre-heating in a 140° C. oven for about 10 minutes to raise the temperature of the mold to 175°–200° F. Excess mold-release agent is wiped off and the mold is allowed to cool to 120° F. before foaming. The initial mixing of the components of the foam formulation is started when the mold is cooled to about 130° F. All components of the reaction mixture, except the polyisocyanate reactant, are measured or weighed into a ½ gallon, 5-inch diameter, cylindrical cardboard carton and mixed 60 seconds with a 6-blade turbine at 4000 revolutions per minute. The polyisocyanate reactant is then weighed into the mixture of other components; stainless steel baffles designed for the ½-gallon carton are inserted, and mixing is continued for 5 seconds. The carton is then lowered to allow the mixer to drain, and the contents are quickly poured into the mold. The mold lid is closed and clamps are placed around the mold to permit flashout. "Exit Time" is observed and defined as the time when all four top holes of the mold are full, that is, when the foam begins to exude from all four holes of the mold. The mold is demolded after standing at room temperature for 10 minutes. After trimming around the edges with scissors, the foam sample is weighed. The foam is then allowed to cure for at least 1 day at room temperature before being submitted for porosity measurements. The respective foams produced with DMAEPN and DMAEEPN were tack-free at the time of demolding. The results including the porosity measurements are given in Table XXI which follows.

TABLE XXI

DMAEPN AND DMAEEPN - CONTAINING CATALYSTS FOR MOLDED HIGH-RESILIENCE FOAM

| Example No. | — | — | — | 60 | 61 | 62 | 63 | 64 |
|---|---|---|---|---|---|---|---|---|
| Run No. | C-44 | C-45 | C-46 | — | — | — | — | — |
| Foam No. | 103 | 104 | 105 | 106 | 107 | 108 | 109 | 110 |
| Foam Formulation G /1/ | | | | | | | | |
| Amine Catalyst System: | | | | | | | | |
| Amine Catalyst A /1/,p.p.h.p. | 0.3 | 0.3 | 0.3 | 0.3 | 0.3 | 0.3 | 0.3 | 0.3 |
| Amine Catalyst B /1/,p.p.h.p. | 0.36 | 0.36 | 0.36 | 0.36 | — | 0.36 | 0.36 | 0.36 |
| Amine Catalyst C /1/,p.p.h.p. | 0.1 | — | — | — | 0.1 | — | — | — |
| PMDETA /2/,p.p.h.p. | — | 0.15 | — | — | — | 0.11 | — | — |
| TMBDA /3/,p.p.h.p. | — | — | 0.15 | — | — | — | 0.11 | — |
| DMAEPN /4/,p.p.h.p. | — | — | — | 0.4 | 0.4 | 0.09 | 0.09 | — |
| DMAEEPN /5/,p.p.h.p. | — | — | — | — | — | — | — | 0.4 |
| Cream time, seconds | 5 | 5 | 5 | 5 | 5 | 5 | 5 | 5 |
| Exit time, seconds | 97 | 79 | 96 | 102 | 106 | 85 | 102 | 100 |
| Weight of foam pad, grams | 664 | 651 | 670 | 672 | 670 | 660 | 670 | 674 |
| Porosity, SCFM | 0.74 | 1.6 | 0.8 | 2.0 | 2.05 | 1.6 | 1.1 | 1.2 |

/1/ As defined in Table XX.
/2/ 1,1,4,7,7-Pentamethyldiethylenetriamine.
/3/ N,N,N',N'-Tetramethyl-1,3-butanediamine.
/4/ 3-(2-Dimethylaminoethoxy)ethoxypropionitrile.
/5/ 3-[2-(2-Dimethylaminoethoxy)ethoxy]propionitrile.

The results of Table XXI indicate that Foams 106 to 109 of Examples 60 to 63, in which DMAEPN was present, were of higher porosity (2.0, 2.05, 1.6 and 1.1) than the porosity of Foam 103 of Run C-44 (0.74). Further, although Foam 104 of Run C-45 in which PMDETA (0.15 p.p.h.p.) but no DMAEPN was present, provided a foam of enhanced porosity (1.6) relative to Foam 103 (0.74), the presence of DMAEPN (0.09 p.p.h.p.) in combination with PMDETA (0.11 p.p.h.p.) as in Example 62 provided the same porosity of 1.6. Enhancement of porosity was observed when DMAEPN was used in combination with TMBDA. Thus, in Example 63, 0.09 p.p.h.p. of DMAEPN and 0.11 p.p.h.p. of TMBDA provided a foam porosity of 1.1 whereas in Run C-46 in which TMBDA was present at 0.15 p.p.h.p., foam porosity was only 0.8. It should also be noted that Foam 110, in which DMAEEPN was present, provided a higher porosity (1.2 p.p.h.p.) than the porosity of Foam 103 of Run C-44 (0.74). As previously noted, both DMAEPN and DMAEEPN produced a tack-free foam, which is a desirable characteristic in view of the decreasing cycle times for commercial foam production.

EXAMPLE 65

This example illustrates the reactivity of DMAEPN in comparison to that of 3-(2-diethylaminoethoxy)propionitrile (DEAEPN), a compound which is not of this invention. This example follows Foam Procedure I, and the foam formulation is given below.

TABLE XXII

| FOAM FORMULATON H | |
|---|---|
| Components | Parts by Weight |
| Polyol A: A polyether triol having a Hydroxyl No. of 46, produced from glycerol, propylene oxide and ethylene oxide. | 100 |
| Polyisocyanate A: A mixture of the 2,4- and 2,6- isomers of tolylene diisocyanate present in a weight ratio of 80:20, respectively. (Index = 105) | 48 |
| Fyrol-2 /1/ | 12.5 |
| Water | 4.0 |
| Stannous octoate | 0.3 |
| Surfactant A /2/ | 1.0 |
| Amine catalyst /3/ | Varied |

/1/ A product of Stauffer Chemical Company.
/2/ A polysiloxane-polyoxyalkylene block copolymer having the average composi-

TABLE XXII-continued

| FOAM FORMULATON H | |
|---|---|
| Components | Parts by Weight | tion, $Me_3SiO(Me_2SiO)_{78}[MeO(C_3H_6O)_{36}(C_2H_4O)_{30}C_3H_6SiMeO]_{8.1}SiMe_3$ where Me is methyl, employed as a 55 weight percent active solution.
/3/ The specific amine catalysts and the concentration thereof are as given in Table XXIII.

The 3-(2-diethylaminoethoxy)propionitrile (DEAEPN) employed in the control for comparative purposes was prepared as follows: A flask equipped with a magnetic stirrer, reflux condenser, and a dropping funnel was charged with N,N-diethylethanolamine (110 grams, 0.94 mole) and sodium methylate (1.15 grams). Acrylonitrile (50.15 grams, 0.845 moles) was added over a 30-minute period while temperature was maintained at 25°–30° C. After addition, the mixture was allowed to stand overnight. Sulfuric acid (2.1 ml.) was then added and the solution filtered. The filtrate was distilled to yield DEAEPN (159 grams, 77 percent of theory). The material was distilled at 140°–145° C./25 mm Hg. [Literature: boiling point 140°–145° C./25 mm Hg. F. C. Whitmore, et al, Journal of American Chemical Society, 66, 725 (1944)].

The results of the comparison appear in Table XXIII. which follows.

TABLE XXIII

| FREE-RISE FLEXIBLE POLYETHER FOAM (4 parts water) | | |
|---|---|---|
| Example No. | 65 | — |
| Run No. | — | C-49 |
| Foam No. | 111 | 112 |
| Foam Formulation H[1] | | |
| Amine Catalyst: | | |
| DMAEPN[2], p.p.h.p. | 0.1 | — |
| DEAEPN[3], p.p.h.p. | — | 0.1 |
| Amine N Content, p.p.h.p. × 100 | 1.0 | 0.8 |
| Rise Time, seconds | 151 | 146 |
| Porosity, SCFM | 2.4 | 3.2 |

[1]The other components are as defined in Table XXII.
[2]3-(2-dimethylaminoethoxy)propionitrile.
[3]3-(2-diethylaminoethoxy)propionitrile.

The results of Table XXIII indicate that DMAEPN shows reactivity comparable to that of DEAEPN on a parts by weight basis for all water-blown polyether foams. When compared on a contained amino nitrogen content basis, DEAEPN exhibits slightly greater reactivity. Both DMAEPN and DEAEPN provide acceptable open-cell content.

What is claimed is:

1. A method for producing a cellular urethane polymer which comprises reacting and foaming a reaction mixture containing: (1) an organic polyol reactant comprising a polyether polyol having an average hydroxyl functionality of at least two; (2) an organic polyisocyanate reactant having an average isocyanate functionality of at least two; (3) a blowing agent; and (4) a catalytically effective amount of a catalyst system comprising an N,N-dimethylaminoalkoxypropionitrile having the formula,

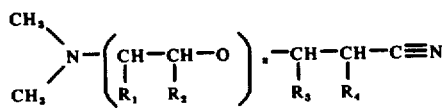

wherein:

$R_1$ and $R_2$ each represents hydrogen, methyl or ethyl provided $R_1$ and $R_2$ cumulatively have no more than 2 carbon atoms;

$R_3$ and $R_4$ each represents hydrogen, methyl or ethyl provided $R_3$ and $R_4$ cumulatively have no more than 2 carbon atoms; and $n$ has an average value of at least 1 and no more than about 5.

2. A method as defined in claim 1 in which the value of $n$ of said N,N-dimethylaminoalkoxypropionitrile is no more than about three.

3. A method as defined in claim 1 in which $R_1$ and $R_2$ taken together have no more than 1 carbon atom, and $R_3$ and $R_4$ taken together have no more than one carbon atom.

4. A method as defined in claim 1 in which each of $R_1$ through $R_4$ of said N,N-dimethylaminoalkoxypropionitrile is hydrogen and the value of $n$ is no more than about 3.

5. A method as defined in claim 1 in which said N,N-dimethylaminoalkoxypropionitrile is 3-(2-dimethylaminoethoxy)propionitrile.

6. A method as defined in claim 1 in which said N,N-dimethylaminoethoxypropionitrile is 3-[2-(2-dimethylaminoethoxy)ethoxy]propionitrile.

7. A method as defined in claim 1 in which said catalyst system additionally contains at least one other tertiary-amine component different from said N,N-dimethylaminoalkoxypropionitriles.

8. A method as defined in claim 7 in which said other tertiary-amine component of the catalyst system is a hydrocarbyl polyamine.

9. A method as defined in claim 7 in which said other tertiary-amine component is a 3-dimethylamino-N,N-dimethylpropionamide.

10. A method as defined in claim 7 in which said other tertiary-amine component is N,N-dimethylethanolamine.

11. A method as defined in claim 7 in which said other tertiary-amine component is N,N-dimethylcyclohexylamine.

12. A method as defined in claim 1 in which said catalyst system additionally contains an organic compound of tin.

13. A method as defined in claim 12 in which said organic compound of tin is a stannous salt of a carboxylic acid.

14. A method as defined in claim 12 in which said organic compound of tin is a dialkyltin dicarboxylate.

15. A method as defined in claim 1 in which said catalyst system contains at least one other tertiary-amine component which is different from said N,N-dimethylaminoalkoxypropionitrile and at least one organic compound of tin.

16. A method for producing cellular polyurethanes which comprises reacting and foaming a reaction mixture containing: (1) an organic polyol reactant comprising a polyether polyol having an average hydroxyl functionality from about two to about eight; (2) an organic polyisocyanate; (3) a blowing agent; and (4) a catalytically effective amount of a catalyst system containing an N,N-dimethylaminoalkoxypropionitrile component having the formula, $(CH_3)_2N-(CH_2-CH_2-)n-CH_2CH_2C\equiv N$, where $n$ has a value from 1 to about 5.

17. A method for producing flexible polyether urethane foam which comprises simultaneously reacting and foaming an organic polyisocyanate reactant and a polyether polyol having an average hydroxyl functionality from 2 to about 4 and a hydroxyl number from about 20 to about 125 in the presence of water as a source of blowing action and 0.05 to about 4 parts by weight per 100 parts by weight of total polyol reactant of a catalyst system comprising at least one N,N-dimethylaminoalkoxypropionitrile selected from the group consisting of 3-(2-dimethylaminoethoxy)propionitrile and 3-[2-(2-dimethylaminoethoxy)ethoxy]propionitrile.

18. A method as defined in claim 17 wherein said catalyst system additionally contains (1) at least one other tertiary-amine component which is different from said N,N-dimethylaminoalkoxypropionitrile and (2) at least one of stannous octoate and dibutyltin dilaurate.

19. A method for producing rigid urethane foam which comprises reacting and foaming an organic polyisocyanate reactant and an organic polyol reactant comprising a polyether polyol having an average hydroxyl functionality from about 3 to about 8 and a hydroxyl number from about 200 to about 1,000 in the presence of a blowing agent comprising a fluorocarbon and 0.1 to about 10 parts by weight per 100 parts by weight of total polyol reactant of an amine catalyst system comprising at least one N,N-dimethylaminoalkoxypropionitrile selected from the group consisting of 3-(2-dimethylaminoethoxy)propionitrile and 3-[2-dimethylaminoethoxy)ethoxy]propionitrile.

20. A method as defined in claim 19 in which said catalyst system additionally contains an organic compound of tin.

21. A method as defined in claim 20 in which said organic compound of tin is dibutyltin dilaurate.

22. A method as defined in claim 19 in which said catalyst system additionally contains at least one hydrocarbyl polyamine.

23. A method as defined in claim 22 in which said hydrocarbyl polyamine is at least one member of the group consisting of triethylenediamine, N,N,N',N'-tetraethylethylenediamine N,N,N', N'-tetramethyl-1,3-butanediamine and 1,1,4,7,7-pentamethyldiethylenetriamine.

24. A method as defined in claim 19 in which said catalyst system additionally contains N,N-dimethylcyclohexylamine.

25. A method as defined in claim 19 in which said catalyst system additionally contains 3-dimethylamino-N,N-dimethylpropionamide.

26. A method as defined in claim 25 in which said catalyst system additionally contains dibutyltin dilaurate.

27. A method as defined in claim 19 in which the blowing agent is fluorocarbon or chlorocarbon.

28. A method as defined in claim 19 in which the blowing agent additionally contains water.

29. A method as defined in claim 19 in which said organic polyisocyanate comprises a polymeric isocyanate.

30. A method as defined in claim 19 in which said organic polyisocyanate comprises tolylene diisocyanate residue obtained from the manufacture of the 2,4- and 2,6- isomers of tolylene diisocyanate.

31. A method as defined in claim 19 in which said polyether polyol is a nitrogen-containing polyether polyol.

32. A method for producing a cellular urethane polymer which comprises reacting and foaming a reaction mixture containing (1) an organic polyisocyanate, (2) a polymer/polyether polyol produced by the in situ polymerization of at least one polymerizable ethylenically unsaturated monomer in a polyether polyol, (3) a blowing agent, and (4) a catalytically effective amount of a catalyst system comprising at least one N,N-dimethylaminoalkoxypropionitrile having the formula:

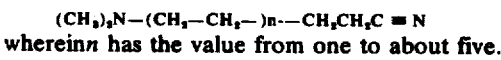

wherein $n$ has the value from one to about five.

33. A method as defined in claim 32 wherein said N,N-dimethylaminoalkoxypropionitrile is 3-(2-dimethylaminoethoxy)propionitrile.

34. A method as defined in claim 32 in which said N,N-dimethylaminoalkoxypropionitrile is 3-[2-(2-dimethylaminoethoxy)ethoxy]propionitrile.

35. A method as defined in claim 32 in which said reaction mixture additionally contains a polyether polyol reactant having an average functionality from 2.1 to about 5, a hydroxyl number from about 18 to about 40, and an average hydroxyl content which is constituted of between about 35 and about 85 mole percent of primary hyroxyl groups.

36. A method for producing semi-flexible polyurethane foam which comprises reacting and foaming a reaction mixture containing: (1) an organic polyisocyanate; (2) an organic polyol reactant which is constituted of (a) from about 50 to 100 percent by weight of a polymer/polyether polyol produced by the in situ polymerization of an ethylenically unsaturated monomer in a polyether polyol and (b) from zero up to about 50 percent by weight of a polyether polyol having an average hydroxyl functionality from 2.1 to about 5, a hydroxyl number from about 18 to about 40 and an average primary hydroxyl content between about 35 and about 85 mole percent; (3) a blowing agent; and (4) 0.1 to about 10 parts by weight per 100 parts by weight of total polyol reactant of a catalyst system comprising at least one of 3-(2-dimethylaminoethoxy)-propionitrile and 3-[2-(2-dimethylaminoethoxy)ethoxy]propionitrile as essentially the sole catalytic component of the reaction mixture or in combination with at least one of (i) and (ii) where (i) is another tertiary-amine component and (ii) is an organic compound of tin.

37. A method for producing high-resilience polyurethane foam which comprises reacting and foaming a reaction mixture containing: (1) an organic polyisocyanate; (2) an organic polyol reactant which is constituted of (a) from about 20 to about 60 weight percent of a polymer/polyether polyol produced by the in situ polymerization of an ethylenically unsaturated monomer in a polyether polyol and (b) from about 80 to about 40 weight percent of a polyether polyol having an average hydroxyl functionality from 2.1 to about 5, a hydroxyl number from 18 to about 40 and an average primary hydroxyl content between about 35 and about 85 mole percent; (3) a blowing agent; and (4) 0.05 to about 4 parts by weight per 100 parts by weight of total polyol reactant of a catalyst system comprising at least one of 3-(2-dimethylaminoethoxy)propionitrile and 3-[2-(2-dimethylaminoethoxy)ethoxy]propionitrile as essentially the sole catalytic components of the reaction mixture or in combination with at least one of (i) and (ii) where (i) is another tertiary-amine component and (ii) is an organic compound of tin.

* * * * *